(12) United States Patent
Ito

(10) Patent No.: US 10,901,826 B2
(45) Date of Patent: Jan. 26, 2021

(54) IMAGE PROCESSING APPARATUS, CONTROL METHOD OF IMAGE PROCESSING APPARATUS TO IMPORT SETTING FILE AND ANALYZE SETTING VALUE FOR DETERMINING WHETHER COMMUNICATION TEST IS REQUIRE TO EXECUTE

(71) Applicant: CANON KABUSHIKI KAISHA, Tokyo (JP)

(72) Inventor: Yuki Ito, Nagareyama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/457,523

(22) Filed: Jun. 28, 2019

(65) Prior Publication Data
US 2020/0019454 A1     Jan. 16, 2020

(30) Foreign Application Priority Data

Jul. 13, 2018 (JP) .................................. 2018-133140
Nov. 28, 2018 (JP) .................................. 2018-222596

(51) Int. Cl.
*H04N 1/00*   (2006.01)
*G06F 11/07*  (2006.01)
*G06F 3/12*   (2006.01)

(52) U.S. Cl.
CPC ...... *G06F 11/0733* (2013.01); *G06F 11/0748* (2013.01); *H04N 1/00129* (2013.01); *H04N 1/00344* (2013.01); *H04N 1/00427* (2013.01); *G06F 3/1255* (2013.01); *G06F 3/1256* (2013.01)

(58) Field of Classification Search
None
See application file for complete search history.

(56) References Cited

U.S. PATENT DOCUMENTS

| 2008/0174809 | A1* | 7/2008 | Savov | G06F 11/2289 358/1.15 |
| 2011/0080609 | A1* | 4/2011 | Park | H04L 12/5692 358/1.15 |
| 2012/0317277 | A1 | 12/2012 | Hirahara | 709/224 |
| 2015/0153969 | A1* | 6/2015 | Okayama | G06F 3/1285 358/1.15 |

FOREIGN PATENT DOCUMENTS

JP     2012-255946     12/2012

* cited by examiner

*Primary Examiner* — Benny Q Tieu
*Assistant Examiner* — Haris Sabah
(74) *Attorney, Agent, or Firm* — Venable LLP

(57) ABSTRACT

An image processing apparatus provides a screen that imports a setting file of a JAVA application operating on the image processing apparatus via a web server, analyzes the imported setting file, obtains a setting value to be reflected and reflects the value, analyzes the imported setting file, performs setting so as to execute a communication test, and executes the communication test in accordance with the setting.

8 Claims, 22 Drawing Sheets

| Destination | Transmission data | Format | Encryption |
|---|---|---|---|
| Management server | All counters, all errors | Binary | Yes |
| Administrator PC | Meter reading counter | Text | No |
| Auditor PC | All counters, all errors | Binary | No |

FIG. 9A

- 661
- Set E-mail
- 662 SMTP authentication | ON | OFF
- 663 User name
- 664 Password
- 665 POP authentication | ON | OFF
- Cancel | Return | OK

FIG. 9B

- 671
- Set E-mail
- 672 POP server
- 673 POP login name
- 674 POP password
- 675 Port number | 110
- 676 TLS | ON | OFF
- Cancel | OK

FIG. 21

```
                    ┌─ 1401
POST /AdminMail HTTP/1.1
Host: 172.16.0.1:8888
Connection: keep-alive
Content-Length: 1000
Content-Type: text/html; charset=UTF-8
User-Agent: AAA
Accept: text/html,*/*
Accept-Encoding: gzip, deflate
Accept-Language: ja-JP,en-US Import
dest_server_ena=1
dest_server_to=
dest_server_cc=
dest_server_bcc=
dest_admin_ena=0
dest_admin_to=
dest_admin_cc=
dest_admin_bcc=
dest_audit_ena=0
dest_audit_to=
dest_audit_cc=
dest_audit_bcc=
send_clock=16:00
send_gap=24
send_test_flag=1
```

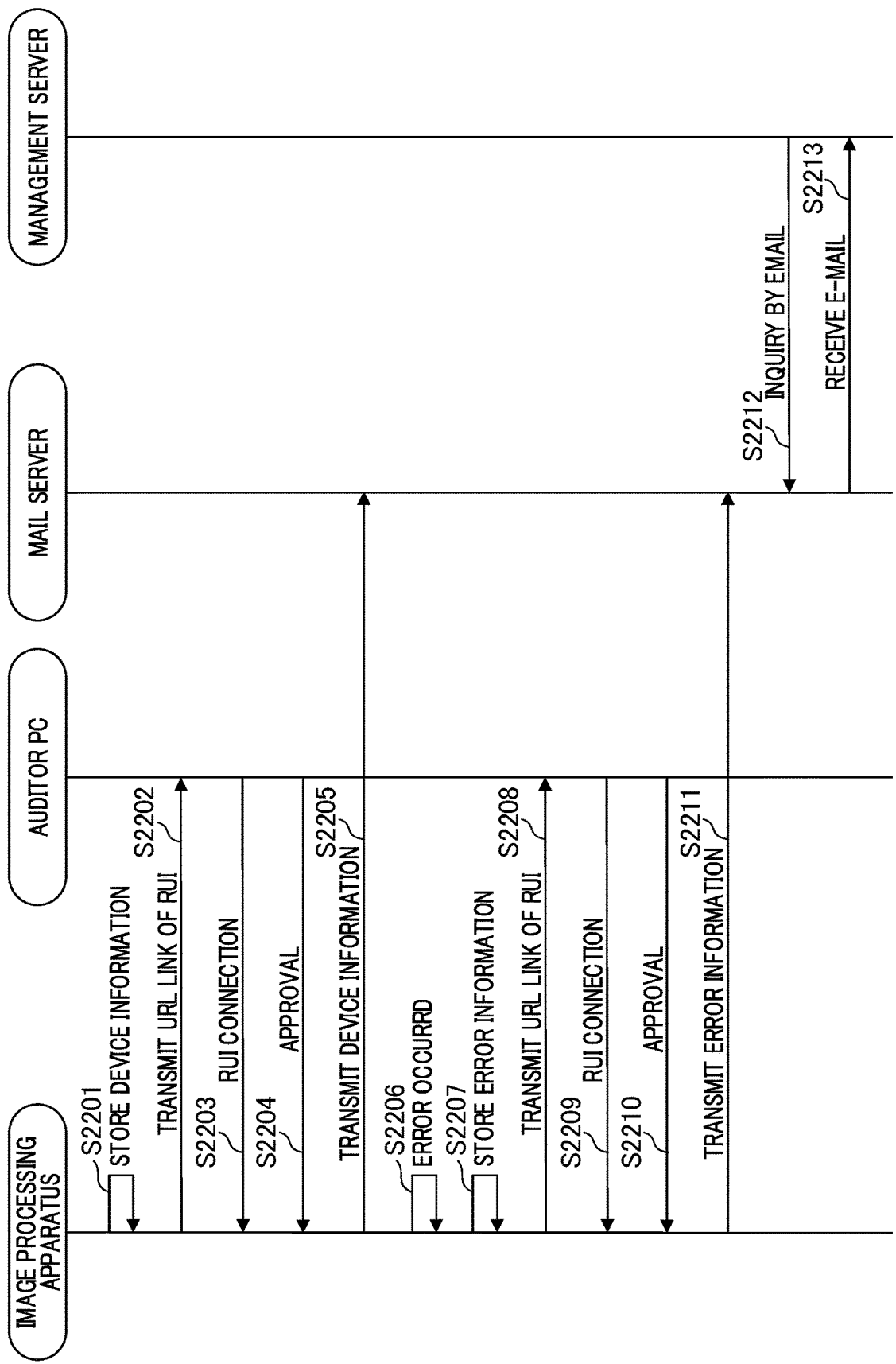

FIG. 23

| | | 2304 | 2305 |
|---|---|---|---|
| 2302 | 2303 | | |
| ✓ | Meter reading counter | 8 | |
| | Error | 6 | |
| | Error | 5 | |
| | Error | 4 | * |

Approval — 2306

2301

IMAGE PROCESSING APPARATUS, CONTROL METHOD OF IMAGE PROCESSING APPARATUS TO IMPORT SETTING FILE AND ANALYZE SETTING VALUE FOR DETERMINING WHETHER COMMUNICATION TEST IS REQUIRE TO EXECUTE

BACKGROUND OF THE INVENTION

Field of the Invention

The present invention relates to an image processing apparatus, a control method for the image processing apparatus, and a program.

Description of the Related Art

Recently, a variety of counter information and device information of an image processing apparatus such as a printer and a copy machine is obtained by collecting the information directly from the image processing apparatus or temporarily collecting the information about a plurality of image processing apparatuses through a remote monitoring apparatus, and then transmitting the information to a management server. The data that has been transmitted to the management server is aggregated, analyzed, and managed by a sales company (service center) and the like, and charging processing is performed based on this information.

Japanese Unexamined Patent Application, First Publication No. 2012-255946 discloses a monitoring apparatus that collects information about a plurality of image forming apparatuses and collectively transmits the collected information to a central management apparatus that manages the information about the image forming apparatuses in an integrated manner.

Two steps are required before the image processing apparatus transmits a variety of information as described above to the management server. As the first step, various settings such as a network setting are performed. Subsequently, as the second step, after the setting has been completed, a communication test for confirming whether or not communication to the management server or an e-mail server has been successful is performed. Subsequently, after confirming that the communication has been successful, actual data is transmitted.

The image processing apparatus has a function of referring to and setting various setting values of the image processing apparatus from an external apparatus connected via a network via a web server incorporated in the image processing apparatus. This function is referred to as an "RUI (Remote User Interface)". Executing the two steps described above is a time-consuming operation in the case of transmitting a variety of information about the image processing apparatus by using the RUI.

Additionally, although performing settings so as to transmit a variety of information from each image processing apparatus to the image processing apparatuses by using the RUI is conceivable, it is necessary to repeat a step that performs various settings and a step that executes a communication test on each image processing apparatus.

SUMMARY OF THE INVENTION

The present invention provides an image processing apparatus that can execute various settings in the image processing apparatus and an instruction to execute a communication test in one step.

An image processing apparatus according to an embodiment of the present invention comprising: a memory storing instructions; and a processor executing the instructions causing the image processing apparatus to: provide a screen that imports a setting file of an application operating on the image processing apparatus via a web server; analyze the imported setting file; perform reflecting a setting value included in the imported setting file; perform, according to the analyzing of the setting file, setting so as to control execution of a communication test for confirming whether or not communication with an external device used by the application is possible; and execute the communication test in accordance with the setting.

Further features of the present invention will become apparent from the following description of exemplary embodiments with reference to the attached drawings.

BRIEF DESCRIPTION OF THE DRAWINGS

FIG. 9A and FIG. 9B illustrate an example of the LUI screen of the image processing apparatus.

FIG. 21 illustrates an HTTP packet upon import of the setting file.

FIG. 22 illustrates a sequence diagram of a process in executing approval in the image processing apparatus.

FIG. 23 illustrates an example of the RUI screen related to the approval in the image processing apparatus.

DESCRIPTION OF THE EMBODIMENTS

Hereinafter, embodiments of the present invention will be described with reference to the drawings.

First Embodiment

Figure 1:
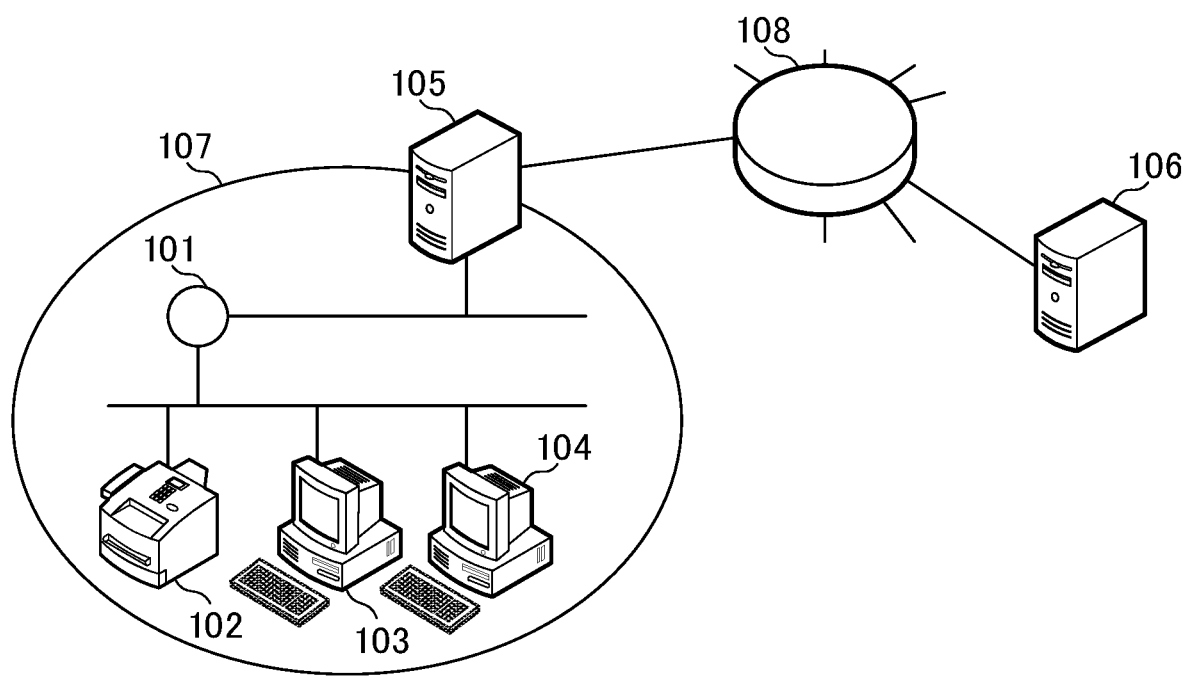
FIG. 1 illustrates a configuration example of a system according to the present embodiment.

FIG. 1 illustrates a configuration of a system, including an image processing apparatus and a management server, showing an embodiment of the present invention. In FIG. 1, an image processing apparatus 102, an administrator PC 103, an auditor PC 104, and a mail server 105 are communicably connected to each other via a LAN 101.

The administrator PC 103 receives an e-mail transmitted from the image processing apparatus 102, and an administrator confirms the content of the received e-mail. Additionally, the administrator PC 103 accesses an RUI (Remote User Interface) function of the image processing apparatus 102, and the administrator changes the setting.

The RUI is a function for accessing the image processing apparatus from an information processing apparatus connected to the image processing apparatus via a network via a web server incorporated in the image processing apparatus. Additionally, in contrast to the RUI, a function of accessing the image processing apparatus by an operation member (for example, input/output device) that is specific to the image processing apparatus is referred to as a "LUI (Local User Interface)".

The auditor PC 104 receives an e-mail transmitted from the image processing apparatus 102, and an auditor confirms the content of the received e-mail. The administrator PC 103 and the auditor PC 104 may be a tablet terminal or a smartphone. The mail server 105 is installed in order for the image processing apparatus 102 and a PC to transmit and receive e-mail. An internet environment 107 indicates an environment of the Internet in which the image processing apparatus 102, the administrator PC 103, the auditor PC 104, and the e-mail server 105 are connected to each other via the LAN 101.

A management server 106 receives an e-mail transmitted from the image processing apparatus 102. Note that in some cases, the management server 106 is also referred to as a "maintenance system server". The management server 106 has a function for managing an operation status in an integrated manner based on, for example, the counter information and operation information of the image processing apparatus 102 and a function for performing inventory management of consumables based on the status information of consumables of the image processing apparatus 102. Hereinafter, a variety of information of the image processing apparatus 102 will be referred to as "device information".

Note that the internet environment 107 and the management server 106 are connected to each other via the Internet 108. The image processing apparatus 102 transmits the device information of the image processing apparatus 102 to the management server 106 that is set as a transmission destination of the device information of the image processing apparatus 102.

Although only one internet environment 107 is shown in FIG. 1, actually, a plurality of internet environments 107 and a management server 106 are connected to each other via the Internet 108. The image processing apparatus 102 includes a digital multi-functional peripheral, a facsimile machine, a printer, a scanner, and an MFP (Multifunction Peripheral). Additionally, the image processing apparatus 102 can also include a digital medical device, a network camera, a car navigation system, and various network home appliances.

Additionally, in the present embodiment, although a communication protocol is assumed to be a protocol such as SMTP, the present invention is not limited in particular thereto. For example, the image processing apparatus 102 may transmit data to the management server 106 via a proxy server and a firewall by using HTTP or HTTPS. Additionally, although only one mail server 105 is shown in FIG. 1, a configuration in which an e-mail transmitted from the image processing apparatus 102 is received by the management server 106 via a plurality of mail servers may be used.

Figure 2A:
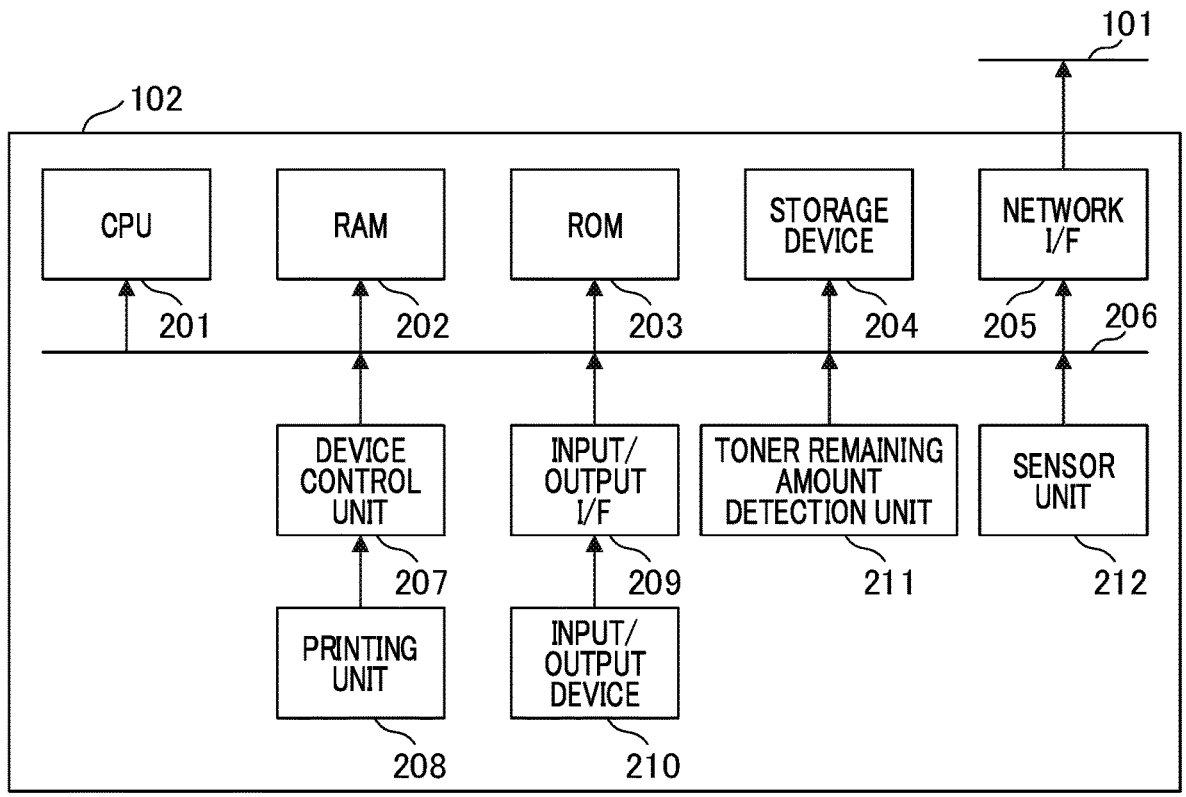
FIG. 2A and FIG. 2B illustrate a configuration example of the hardware for an image processing apparatus and a management server.

FIG. 2A illustrates a configuration example of hardware for the image processing apparatus 102. The image processing apparatus 102 includes a CPU (central processing unit) 201, a RAM (random access memory) 202, a ROM (read only memory) 203, and a storage device 204. Additionally, the image processing apparatus 102 has a network I/F (interface) 205, an internal bus 206, a device control unit 207, a printing unit 208, an input/output I/F 209, an input/output device 210, a toner remaining amount detection unit 211, and a sensor unit 212.

The CPU 201 generally controls each processing unit via the internal bus 206. For example, the CPU 201, the RAM 202, a ROM 203, the storage device 204, the network I/F 205, the device control unit 207, the input/output I/F 209, the toner remaining amount detection unit 211, and the sensor unit 212 are connected to the internal bus 206. A program is stored in the ROM 203. Note that the program includes a program that realizes each software configuration in FIG. 3A to be described below.

The RAM 202 functions as a memory and a work area of the CPU 201. The CPU 201 performs a process that executes the above program together with the RAM 202, the ROM 203, and the storage device 204, and stores the image data on a recording medium such as the storage device 204. Additionally, in addition to the above program, for example, destination information indicating an area where the image processing apparatus 102 is to be shipped is also stored in the ROM 203. For example, a language to be displayed by the input/output device 210 is determined in accordance with this destination information.

The storage device 204 can function as an external storage device, store image data and the like, and store, for example, the above counter information, system information, and monitoring information instead of the RAM 202. The network I/F 205 exchanges data unidirectionally or bidirectionally with an external network device or PC via the LAN 101. The device control unit 207 controls the printing unit 208.

The printing unit 208 is, for example, an electrophotographic printing unit and includes an exposure unit, a transfer unit, and a fixing device. The input/output device 210 includes a plurality of configurations that are responsible for input and output in the image processing apparatus 102. Specifically, the input/output device 210 receives an input (for example, a button input) from a user, and transmits a signal corresponding to the input to the above-described processing units by using the input/output I/F 209.

The input/output device 210 also includes a display device (for example, a touch panel) for providing necessary information to the user and receiving user's operations.

Furthermore, the input/output device 210 may include a scanning device for reading an original and receiving electronic data as an input.

The toner remaining amount detection unit 211 detects a toner remaining amount of the printing unit 208 by a sensor and generates the detected toner remaining amount as a signal such as an alert or an alarm. The sensor unit 212 detects the attachment and detachment of the toner bottle and can read a serial number of the toner bottle that has been set. Note that, in the present embodiment, although a toner is described as an example of the consumables of the image processing apparatus 102, another consumable may be used.

Figure 2B:
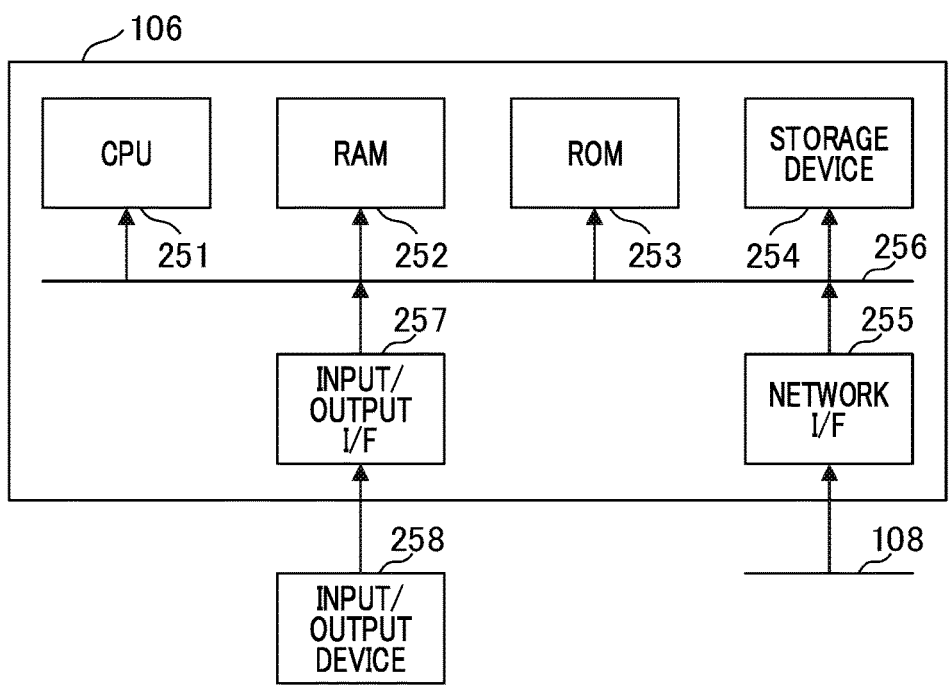

FIG. 2B illustrates a configuration example of hardware of the management server 106. The management server 106 has a CPU 251, a RAM 252, a ROM 253, a storage device 254, an internal bus 256, an input/output I/F 257, and a network I/F 255. The CPU 251 generally controls each processing unit via the internal bus 256. For example, the CPU 251, the RAM 252, the ROM 253, the storage device 254, the network I/F 255, and the input/output I/F 257 are connected to the internal bus 256.

Programs are stored in the ROM 253 and the storage device 254. Note that the programs include a program that realizes the software configuration in FIG. 3B to be described below. The RAM 252 functions as a memory or a work area of the CPU 251. The CPU 251 executes the above program together with the RAM 252, the ROM 253, and the storage device 254, and stores data in a storage medium such as the storage device 204.

The storage device 254 is a storage device such as a hard disk drive (HDD) and a solid state drive (SSD). The storage device 254 functions as an external storage device and stores management information of the image processing apparatus 102, and can also store, for example, system information and processing information instead of the RAM 252. The input/output I/F 257 includes a PS2, a Universal Serial Bus (USB I/F), and an analog or digital display I/F.

An input/output device 258 is, for example, a keyboard, a mouse, a CRT, and a liquid crystal display, and can be connected to the management server 106 via the input/output I/F 257. The management server 106 can communicate with the image processing apparatus 102, the administrator PC 103, and the auditor PC 104 by performing communication via the LAN 101 and the Internet environments 107 and 108 by using the network I/F 255. Note that the hardware configurations of the administrator PC 103 and the auditor PC 104 are also the same as that of the management server 106 described above.

Figure 3A:
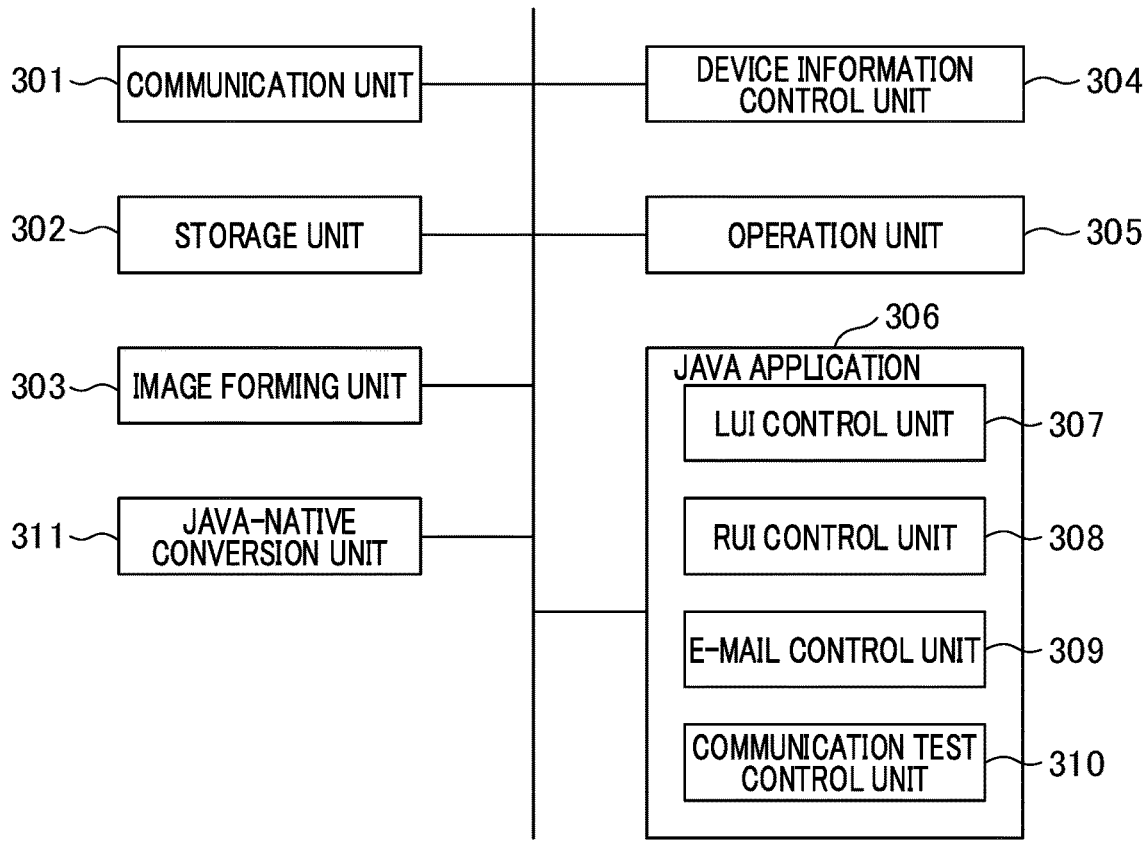
FIG. 3A and FIG. 3B illustrate a configuration example of the software for the image processing apparatus and the management server.

FIG. 3A illustrates a configuration example of software of the image processing apparatus 102. Note that, in particular, software (modules) for a function related to the present invention is shown in FIG. 3A, and another configuration will be omitted. The image processing apparatus 102 includes a communication unit 301, a storage unit 302, an image forming unit 303, a device information control unit 304, an operation unit 305, a JAVA application 306, and a JAVA-Native conversion unit 311.

The communication unit 301 transmits device information about the image processing apparatus 102 to the management server 106. Additionally, the communication unit 301 receives an instruction/information transmitted from the management server 106. These transmission and reception are performed by communication using a protocol such as SMTP or HTTP/HTTPS. The storage unit 302 exchanges information with each storage region of the RAM 202, the ROM 203, and the storage device 204.

The storage unit 302 stores, for example, the operation history of the image processing apparatus 102 and data representing various abnormal states in the storage region to serve as device information. Note that the device information also includes identification information of the image processing apparatus such as an apparatus ID, and communication information such as IP address. Additionally, the device information also includes operation information such as counter information, abnormal state information (failure information, error information), status information of consumables, and a variety of device information.

Additionally, the storage unit 302 stores communication information such as the IP address of the management server 106 that manages the image processing apparatus 102 in the storage region to serve as the information of the management server 106. The image forming unit 303 generates and outputs printing data. The device information control unit 304 performs, for example, printing control of the image processing apparatus 102, and management of an abnormal state, as well as management of counter information and management of notification information.

Additionally, the device information control unit 304 performs control related to a color adjustment, a printing mode, and a setting of other functions. Additionally, the device information control unit 304 generates failure information to be transmitted to the management server 106 if a failure occurs in the image processing apparatus 102. Note that the device information control unit 304 manages not only the failure information but also information about various consumables such as a toner and parts (consumable information).

The failure information, the consumable item information, and the operation information such as the counter information of the image processing apparatus 102 are transmitted to the management server 106 via the network I/F 205. The operation unit 305 is an interface that makes possible an operation instruction to the image processing apparatus 102 including a printing instruction from the user.

The JAVA application 306 is a Java (registered trademark) application including an LUI control unit 307, an RUI control unit 308, an e-mail control unit 309, and a communication test control unit 310. The LUI control unit 307 displays icons and various setting screens on the operation unit 305. The LUI control unit 307 causes the storage unit 302 to store the setting if any setting is performed on the image processing apparatus 102 via the various setting screens. Additionally, if an instruction to execute the communication test is provided via the operation unit 305, the LUI control unit 307 causes the communication test control unit 310 to execute the communication test.

The RUI control unit 308 displays a screen on which a setting file can be imported and exported upon access from a web browser or the like of the external information processing apparatus. If an instruction is provided to import a setting file via the screen, the RUI control unit 308 analyzes the setting file that has been imported to the storage unit 302 and reflects (stores) a setting value to be reflected.

Additionally, the RUI control unit 308 analyzes the imported setting file, and if the information about the execution of the communication test is included, the RUI control unit 308 causes the communication test control unit 310 to execute the communication test. The e-mail control unit 309 generates e-mail (electronic mail) data and provides an instruction to transmit an e-mail to the communication unit 301.

If the communication test control unit 310 receives an instruction to execute a communication test from the LUI control unit 307 or the RUI control unit 308, the communication test control unit 310 generates an e-mail and transmits it to the mail server 105. The JAVA-Native conversion unit 311 is an API for transmitting and receiving information between the JAVA application and the Native module. The elements which are other than the JAVA application 306, are Native modules.

Figure 3B:
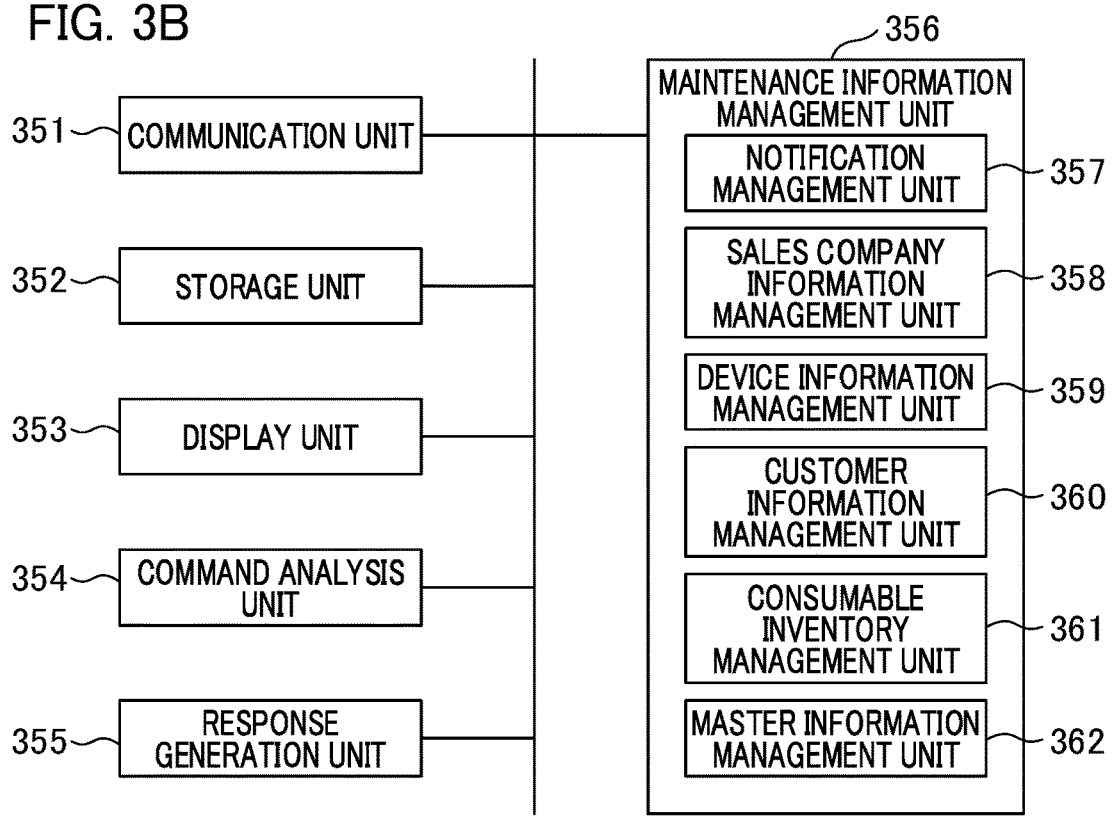

FIG. 3B illustrates a configuration example of software of the management server 106. Note that, in FIG. 3B, in particular, the software configuration for the function related to the present invention is illustrated, and other configurations will be omitted. The management server 106 is configured by a communication unit 351, a storage unit 352, a display unit 353, a command analysis unit 354, a response generation unit 355, and a maintenance information management unit 356.

The communication unit 351 communicates with the image processing apparatus 102 and the mail server 105. The communication unit 351 receives the device information transmitted from the image processing apparatus 102 by e-mail, and transmits a necessary instruction and information to the image processing apparatus 102. The storage unit 352 exchanges information with each storage region of the RAM 252, the ROM 253, and the storage device 254, and stores, for example, device information, sales company information, and customer information in the storage region.

The display unit 353 performs processing for displaying the device information stored in the storage unit 352 as a web page (screen). In the management server 106, a WWW server program is operating and provides the above web page to the web browser in response to a request from the web browser of its own device or an external device. As a result, for example, a service person of a sales company can browse the above information through a web browser on a PC 110. Hereinafter, a website for browsing the above-described web page is referred to as "a portal site".

The command analysis unit 354 analyzes a command that has been transmitted from the image processing apparatus 102. The command analysis unit 354 reflects the analyzed result on, for example, the storage unit 352, the maintenance information management unit 356, and the display unit 353. The response generation unit 355 generates a response to the image processing apparatus 102 for the command analyzed by the command analysis unit 354. The maintenance information management unit 356 manages the information that is necessary for monitoring and maintaining the image processing apparatus 102.

The maintenance information management unit 356 includes a notification management unit 357, a sales company information management unit 358, a device information management unit 359, a customer information management unit 360, a consumable inventory management unit 361, and a master information management unit 362. The notification management unit 357 generates notification information and specifies a notification destination to generate notification data. The notification provided by the notification management unit 357 includes a maintenance request notification to a service person who maintains the image processing apparatus 102, and a replenishment request notification of consumables.

The sales company information management unit 358 manages the image processing apparatus 102 installed by the customer and manages the information about the sales company that performs support. The device information management unit 359 manages the image processing apparatus 102 that is to be maintained. For example, the identification information of the image processing apparatus, abnormal state information of the image processing apparatus, maintenance history, administrator information of the image processing apparatus, and consumable item information of the image processing apparatus are managed by the device information management unit 359.

Note that the abnormal state information includes operation information such as an error, an alarm, and a jam. The abnormal state information is displayed on the portal site and is browsed by, for example, a dispatcher and a service person of a sales company. Additionally, the state of the above operation information is managed by wording, for example, "The response to the abnormal state has not been completed", "The abnormal state is in progress", and "The response to the abnormal state has been completed", which depends on the state of the response from the sales company. The customer information management unit 360 manages the customer information that the image processing apparatus 102 has installed.

The information managed by the customer information management unit 360 also includes information about a maintenance contract with a sales company. The consumable inventory management unit 361 manages inventory of consumables of the image processing apparatus 102 such as toner/ink and parts. Specifically, the consumable inventory management unit 361 performs inventory subtraction based on the consumable information such as information indicating a toner/ink remaining amount transmitted from the image processing apparatus 102 and the information indicating replacement of parts. Subsequently, the consumable inventory management unit 361 performs a notification such as a replenishment request notification of the consumables by interlocking with the notification management unit 357 when the inventory number reaches a threshold that has been set.

The master information management unit 362 manages master information necessary for displaying, for example, model information, operation information, and parts information. The master information is, for example, a product name of a certain model, information about consumables to be used, a description of operation information transmitted from the image processing apparatus 102, and a value of service life of parts.

Figures 4, 5:
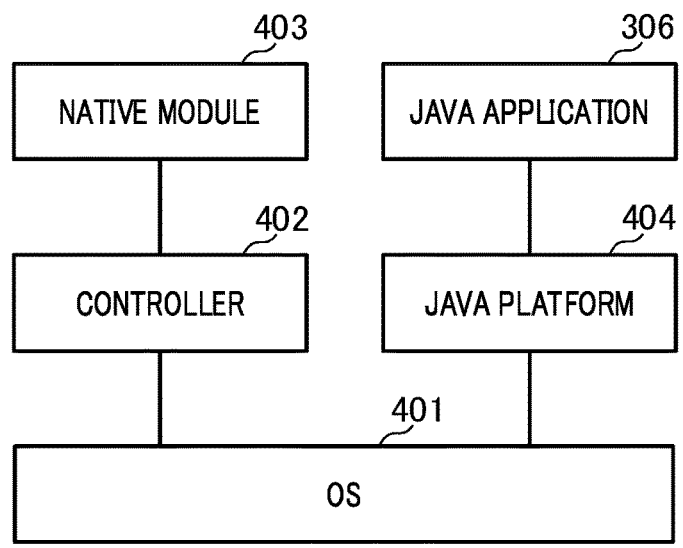
FIG. 4 illustrates an example of architecture of the image processing apparatus.
FIG. 5 illustrates the content of each e-mail destination.

FIG. 4 illustrates an example of the architecture of the image processing apparatus 102. Each of the software of the image processing apparatus 102 operates on an OS 401. A controller 402 and a JAVA platform 404 operate on the OS 401, and a Native module 403 operates on the controller 402. The elements except for the JAVA application 306 shown in FIG. 3A are the Native modules 403.

The JAVA application 306 operates on the JAVA platform 404. Since the Native module 403 and the JAVA application 306 operate with different resources, it is necessary to transmit and receive information through loopback communication or the JAVA-Native conversion unit 311. While the Native module 403 is software that provides a function provided to the image processing apparatus 102 as a standard, the JAVA application 306 is software additionally installed on the image processing apparatus 102.

The JAVA application 306 is software based on Java (registered trademark), and can easily realize adding a function to the image processing apparatus 102. Note that, in the present embodiment, as an example, although the case in which adding a function to the image processing apparatus 102 is realized by the JAVA platform 404 and the JAVA application 306 will be described, the present invention is not limited thereto and another language system may be used.

FIG. 5 illustrates the content of each e-mail destination transmitted from the image processing apparatus 102. A destination 501 indicates e-mail destinations, and, in FIG. 5, the management server 106, the administrator PC 103, and the auditor PC 104 are illustrated as the destinations. A transmission data 502 indicates data content transmitted by e-mail. The data content transmitted to the management server 106 and the auditor PC 104 are all counter information and all error information, and may include other information.

In contrast, the data content transmitted to the administrator PC 103 is only meter reading counter information. The meter reading counter information is counter information used for charging among the counter information. The counter information includes information about the total number of printings and may include the number of printings for each print type, such as color prints and black and white prints. Although the data content to be transmitted to each device is set in FIG. 10 or FIG. 17A and the like to be described below, the present invention is not limited thereto and, for example, the data content to be transmitted may be set in detail for each item.

A format 503 indicates the data format to be transmitted. The data format to be transmitted to the management server 106 and the auditor PC 104 is binary, and the data format to be transmitted to the administrator PC 103 is text. An encryption 504 indicates the presence or absence of the encryption of data to be transmitted. The example shown in FIG. 5 shows that the data transmitted to the management server 106 is encrypted and the data transmitted to the administrator PC 103 and the auditor PC 104 is not encrypted.

Since the management server 106 manages all data related to the image processing apparatus 102, the data to be transmitted to the management server 106 is all data, and the data format is binary in order to reduce the data volume. Additionally, the data to be transmitted for preventing data interception in the process of being transmitted is encrypted. The administrator PC 103 does not have to recognize an error, and in order to manage only the meter reading counter information, the data transmitted to the administrator PC 103 is only the meter reading counter information, and the data format is text and the data is not encrypted.

In the auditor PC 104, in order to confirm the data that is the same as the management server 106, the data to be transmitted to the auditor PC 104 is all data, and the data format is binary. Additionally, the data to be transmitted is not encrypted. The administrator PC 103 and the auditor PC 104 can confirm the content of data because the data is not encrypted.

Figure 6A:
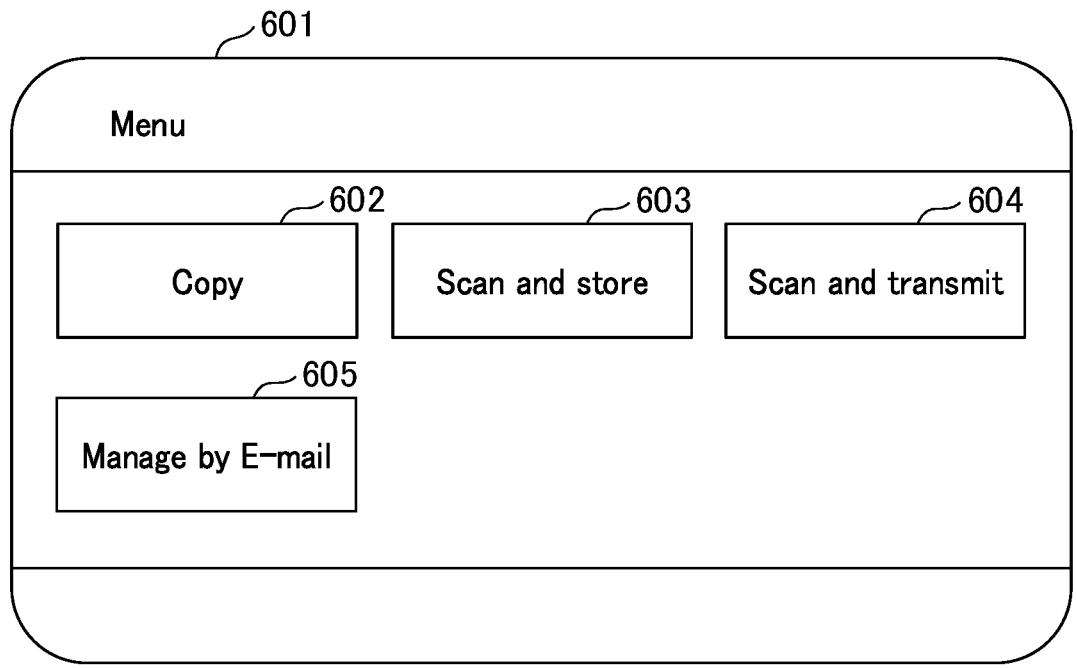
FIG. 6A and FIG. 6B illustrate an example of an LUI screen of the image processing apparatus.

FIG. 6A is an example of the LUI screen of the top menu displayed by the LUI control unit 307 of the image processing apparatus 102. An LUI screen 601 of the top menu has, for example, a "copy" button 602, a "scan and save" button 603, a "scan and transmit" button 604, and a "manage by e-mail" button 605.

Upon the pressing of each button, the screen transitions to an LUI screen for each function of the image processing apparatus 102. Hereinafter, the case in which the "manage by e-mail" 605 button has been pressed will be described. Upon the pressing of the "manage by e-mail" 605 button, the screen transits to an LUI screen related to the management of a variety of device information by e-mail.

Figure 6B:
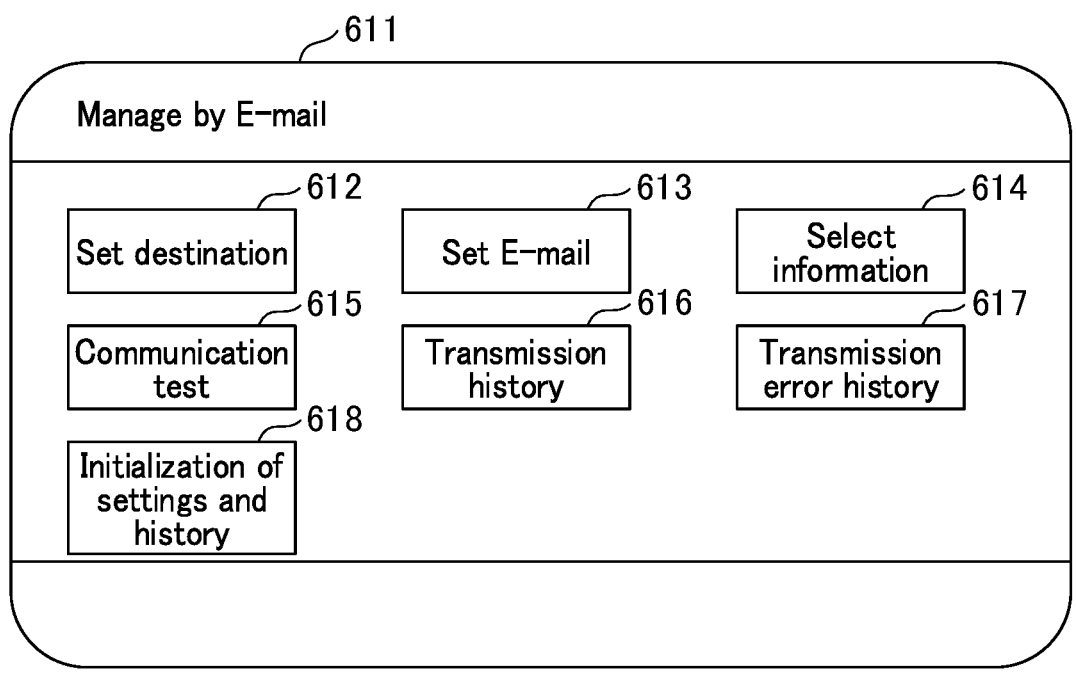

FIG. 6B illustrates an example of the LUI screen displayed upon the pressing of the "manage by e-mail" 605 button. A LUI screen 611 has, for example, a "transmission destination setting" button 612, an "e-mail setting" button 613, a "information selection" button 614, a "communication test" button 615, a "transmission history" button 616, a "transmission error history" button 617, and an "initialization of setting and history" button 618.

By pressing each button, the screen transitions to a detailed setting screen related to the management of a variety of device information by e-mail. Specifically, the setting includes a network setting related to e-mail transmission, a transmission content setting, and a setting related to transmission history and the like. Upon the pressing of the "transmission destination setting" button 612, the screen transitions to an LUI screen 621 (FIG. 7A) that displays a transmission destination setting. Upon the pressing of the "e-mail setting" button 613, the screen transitions to an LUI screen 651 (FIG. 8B) that displays an e-mail setting. Upon the pressing of the "information selection" button 614, the screen transitions to an LUI screen 681 (FIG. 10) that displays an information selection setting.

Figure 11A:
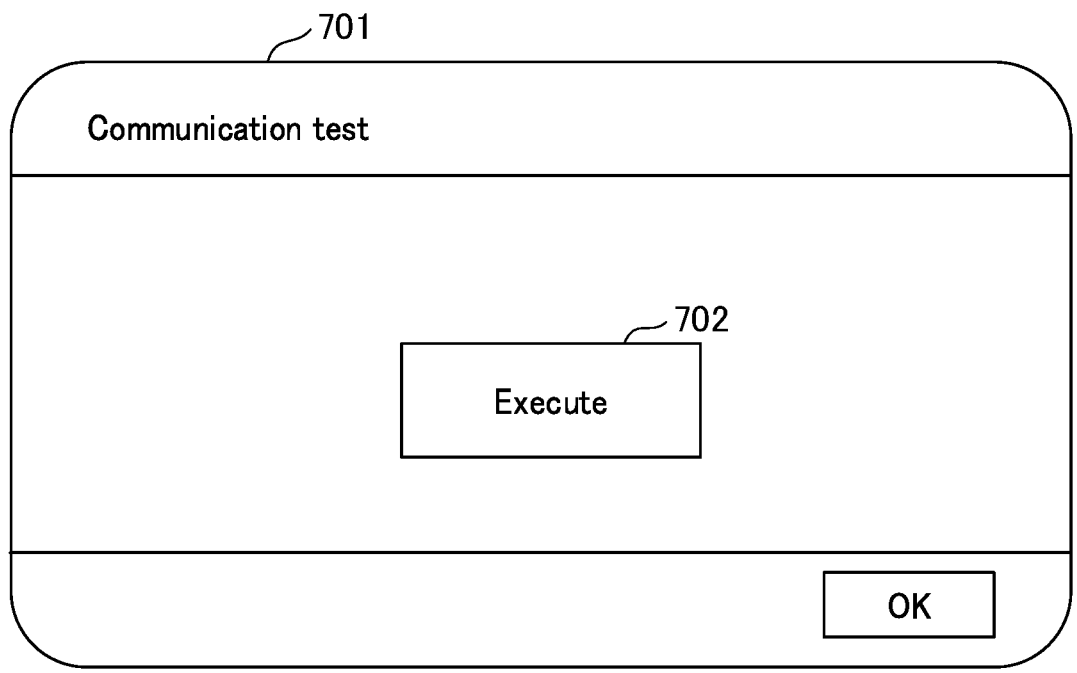
FIG. 11A and FIG. 11B illustrate an example of the LUI screen related to a communication test of the image processing apparatus.
Figure 13A:
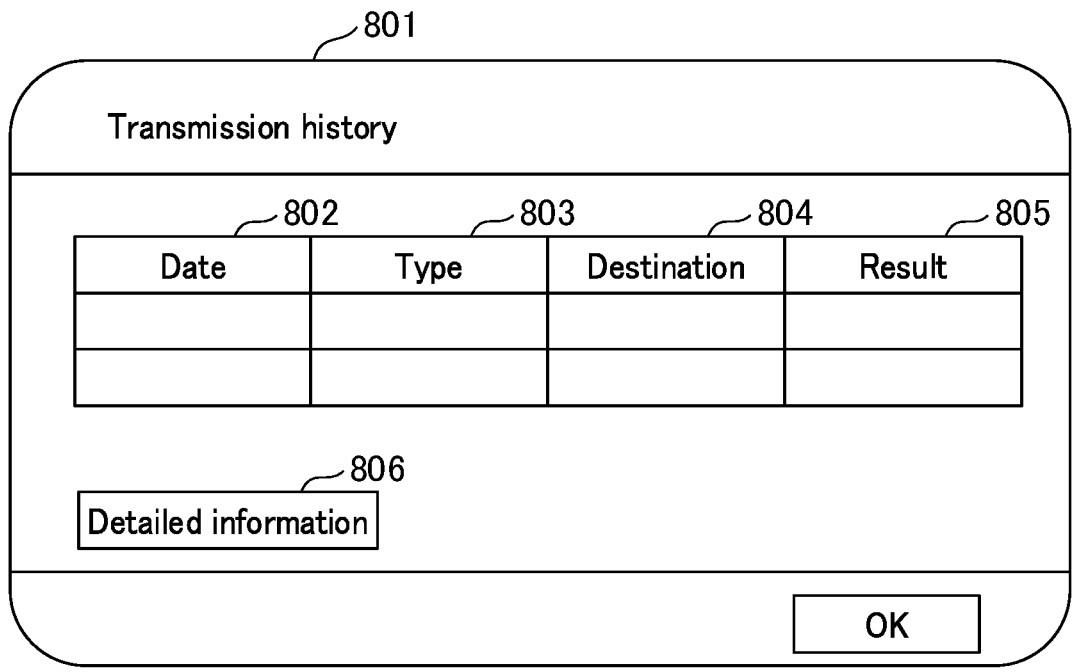
FIG. 13A and FIG. 13B illustrate an example of the LUI screen related to a transmission history of the image processing apparatus.

Upon the pressing of the "communication test" button 615, the screen transitions to an LUI screen 701 that displays a communication test (FIG. 11A). Upon the pressing of the "transmission history" button 616, the screen transitions to an LUI screen 801 that displays a transmission history (FIG. 13A). Upon the pressing of the "transmission error history" button 617, the screen transitions to an LUI screen 821 (FIG. 14A) that displays a transmission error history. Upon the pressing of the "initialization of setting and history" 618, the screen transitions to an LUI screen 901 (FIG. 15A) that displays an initialization of setting and history.

Figure 7A:
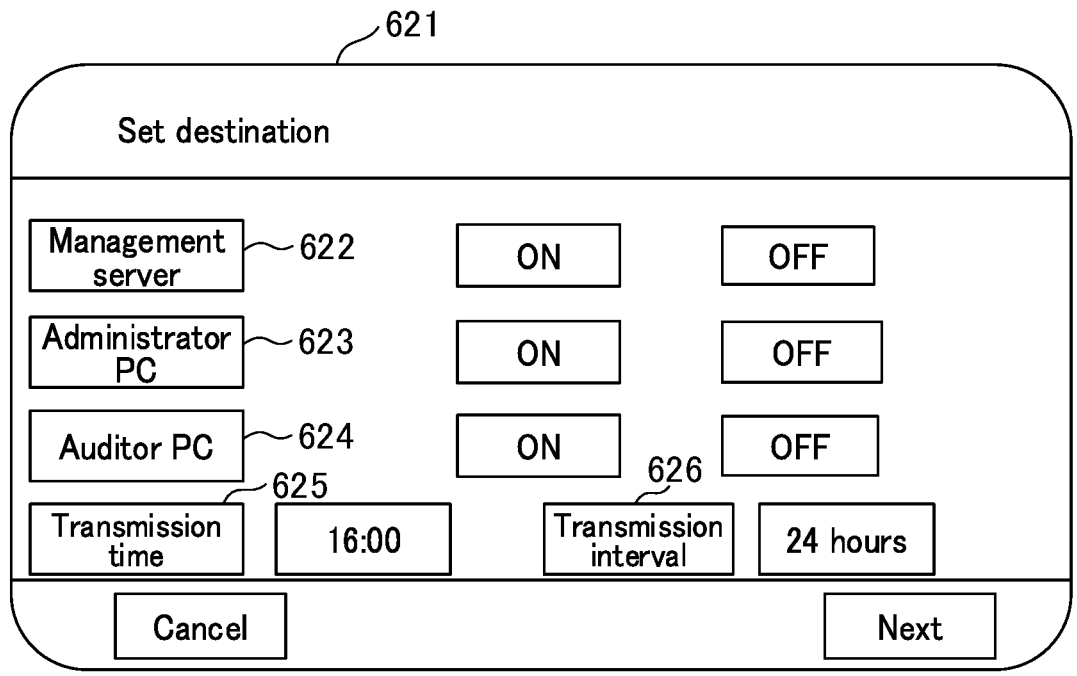
FIG. 7A and FIG. 7B illustrate an example of the LUI screen of the image processing apparatus.

FIG. 7A is an example of the LUI screen that displays a transmission destination setting. On the LUI screen 621 that displays a destination setting, it is possible to set the presence or absence of the e-mail transmission to a management server (ON/OFF) 622, the presence or absence of the e-mail transmission to an administrator PC (ON/OFF) 623, and the presence or absence of the e-mail transmission to an auditor PC (ON/OFF) 624. Additionally, on the LUI screen 621, it is possible to set a transmission time 625 and a transmission interval 626.

In accordance with the setting of the transmission time 625, periodical e-mail transmissions are executed at the point in time when the set time arrives. In accordance with the setting of the transmission interval 626, periodic e-mail transmissions are executed after the time set in the transmission interval 626 has elapsed from the previous transmission time. Upon the pressing of the "next" button on the LUI screen 621 that displays the transmission destination setting, the screen transitions to an LUI screen 631 (FIG. 7B) that displays the transmission destination setting.

Figure 7B:
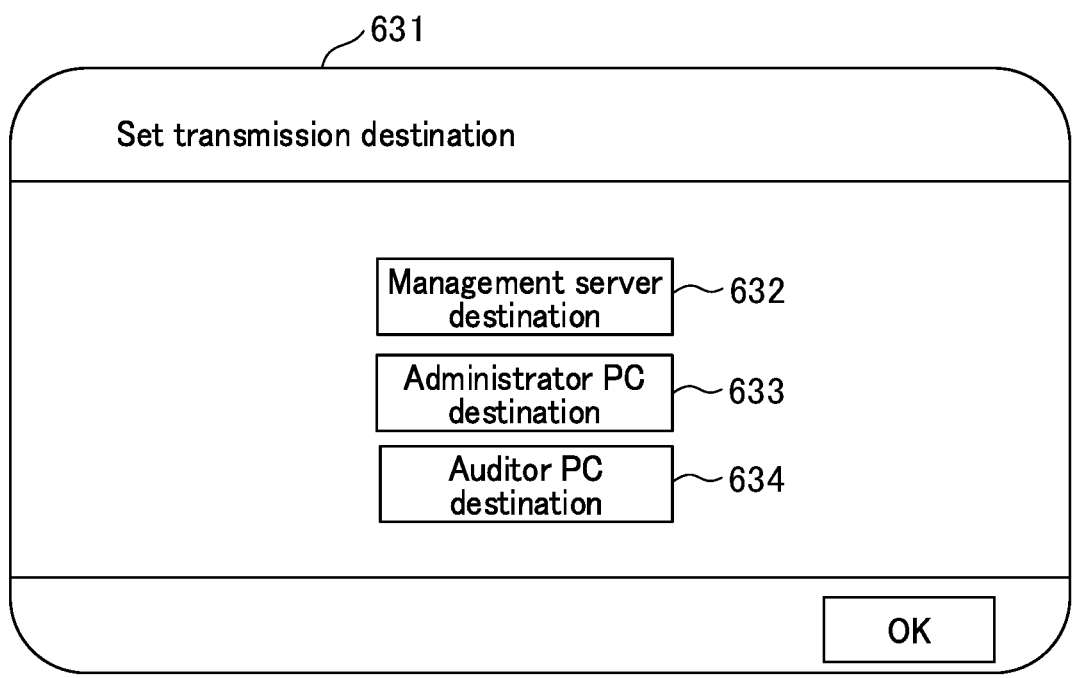

FIG. 7B is an example of the LUI screen that displays the transmission destination setting. The LUI screen 631 that displays the destination setting has a "management server destination" button 632, an "administrator PC destination" button 633, and an "auditor PC destination" button 634. Upon the pressing of each button, the screen transitions to a detailed setting screen related to the transmission destination. Specifically, the screen transitions to an LUI screen 641 on which an e-mail address is set as each destination. The screen transitions to a screen having the same format no matter which button is pressed, where individual e-mail addresses can be set for each destination.

Figure 8A:
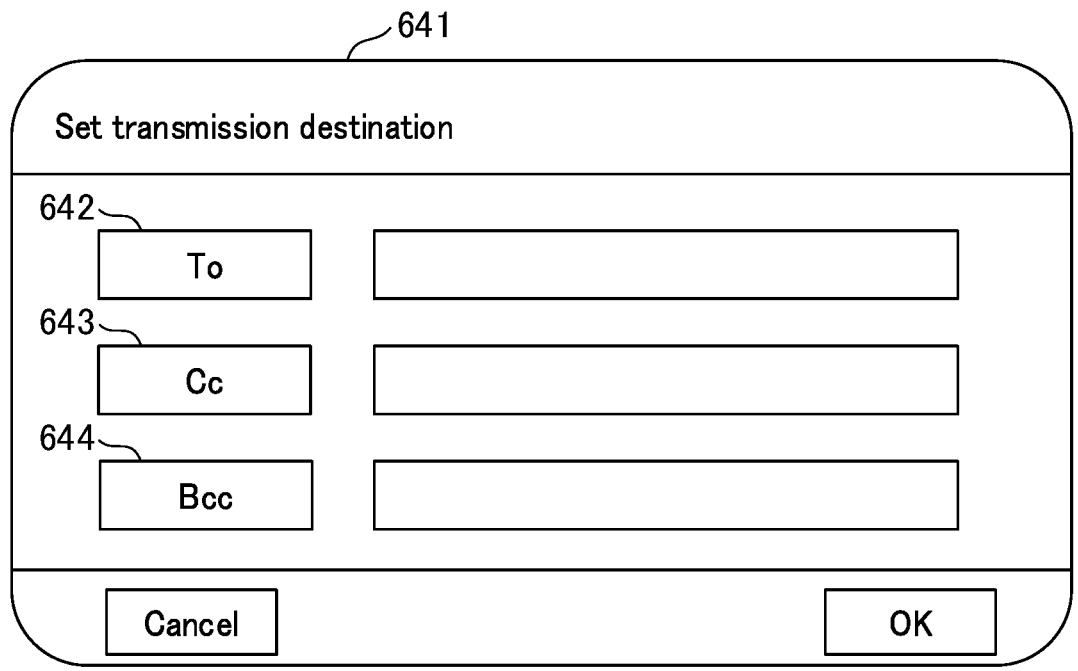
FIG. 8A and FIG. 8B illustrate an example of the LUI screen of the image processing apparatus.

FIG. 8A is an example of the LUI screen on which e-mail addresses are set. On the LUI screen 641 that displays the e-mail address setting, an e-mail address set to a "To" 642, an e-mail address set to a "Cc" 643, and an e-mail address set to a "Bcc" 644 can be respectively set.

Figure 8B:
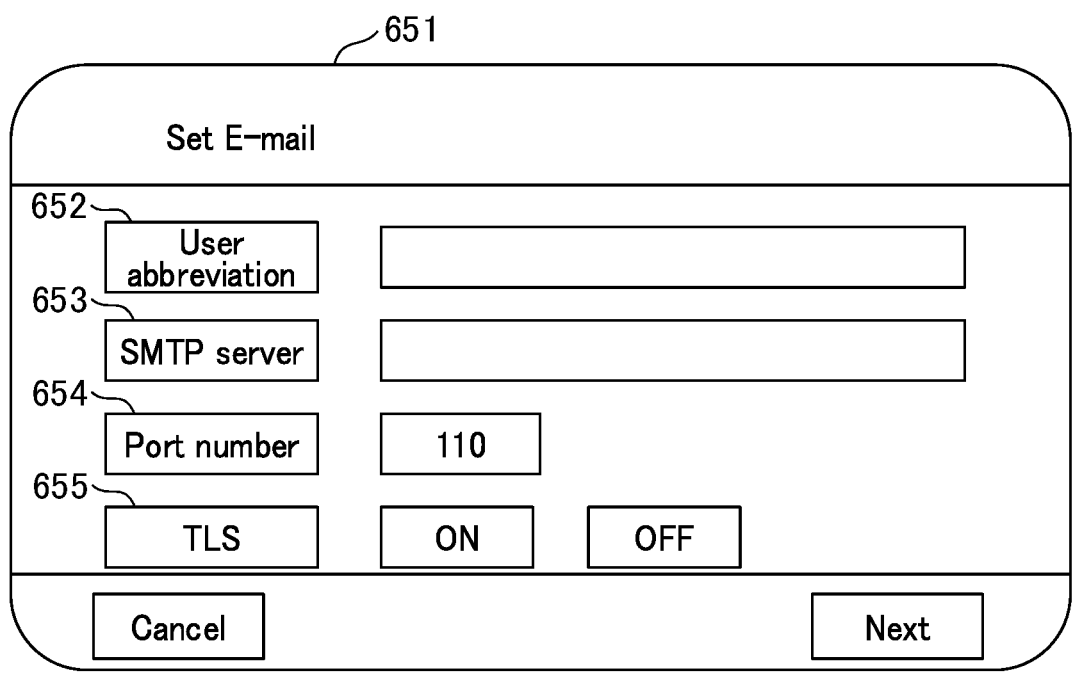

FIG. 8B is an example of the LUI screen that displays the e-mail setting. The screen transitions to the LUI screen 651 that displays the e-mail setting by the pressing of the "e-mail setting" button 613 on the LUI screen (FIG. 6B). On the LUI screen 651 that displays the e-mail setting, a user abbreviation 652, an IP address of an SMTP server 653, the port number "110", and ON/OFF of a TLS 655 can be set. Upon the pressing of the "Next" button on the LUI screen 651 for the e-mail setting, the screen transitions to an LUI screen 661 (FIG. 9A) that displays the SMTP authentication setting.

FIG. 9A is an example of the LUI screen that displays the SMTP authentication setting. On the LUI screen 661 that displays the SMTP authentication setting, ON/OFF of an SMTP authentication 662, a user name 663 used in the SMTP authentication, a password 664 that is set in the SMTP authentication, and ON/OFF of a POP authentication 665 can be set. Upon the pressing of the POP authentication "ON" button on the LUI screen 661 that displays the SMTP authentication setting, the screen transitions to an LUI screen 671 that displays the POP authentication setting (FIG. 9B).

FIG. 9B is an example of the LUI screen that displays the POP authentication setting. On the LUI screen 671 that displays the POP authentication setting, an IP address of a POP server 672, a login name 673 used for the POP authentication, a password 674 used for the POP authentication, a port number 675, and ON/OFF of a TLS 676 can be set. Upon the pressing of the "OK" button on the LUI screen 671 that displays the POP authentication setting, the POP authentication setting is determined, and the screen transitions to the LUI screen 661 that displays the SMTP authentication setting (FIG. 9A).

Figure 10:
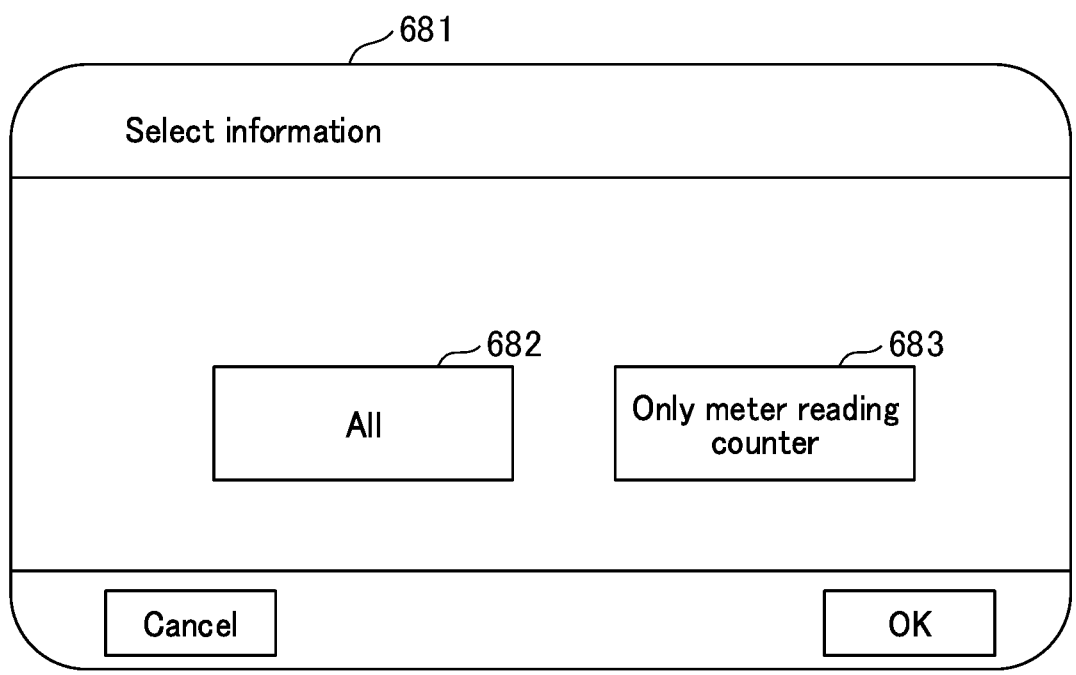
FIG. 10 illustrates an example of the LUI screen of the image processing apparatus.

FIG. 10 is an example of the LUI screen that displays the information selection setting. By the pressing of the information selection button 614 on the LUI screen (FIG. 6B), the screen transitions to the LUI screen 681 that displays the information selection setting. On an LUI screen 681 that displays the information selection setting, either an "all" button 682 or an "only meter reading counter" button 683 can be selected as data to be transmitted from the image processing apparatus 102 by e-mail.

If the "all" button 682 is selected, all pieces of counter information and all pieces of error information are set as data to be transmitted by e-mail, and if only the "meter reading counter" button 683 is selected, the meter reading counter information is set as data to be transmitted by e-mail.

FIG. 11A is an example of the LUI screen that displays the communication test. By the pressing of the communication test 615 on the LUI screen (FIG. 6B), the screen transitions to the LUI screen 701 that displays the communication test. The LUI screen 701 that displays the communication test has an "execute" button 702 for the communication test. Upon the pressing of the "execute" button 702 of the communication test, an e-mail is transmitted to the mail server 105 as a communication test.

The e-mail content may be anything. If the transmission result has succeeded, the screen transitions to an LUI screen 711 (FIG. 11B) that displays that the communication test has succeeded, and if the transmission result is a failure, the screen transitions to an LUI screen 721 (FIG. 12) on which the fact that the communication test has failed is displayed.

Figure 11B:
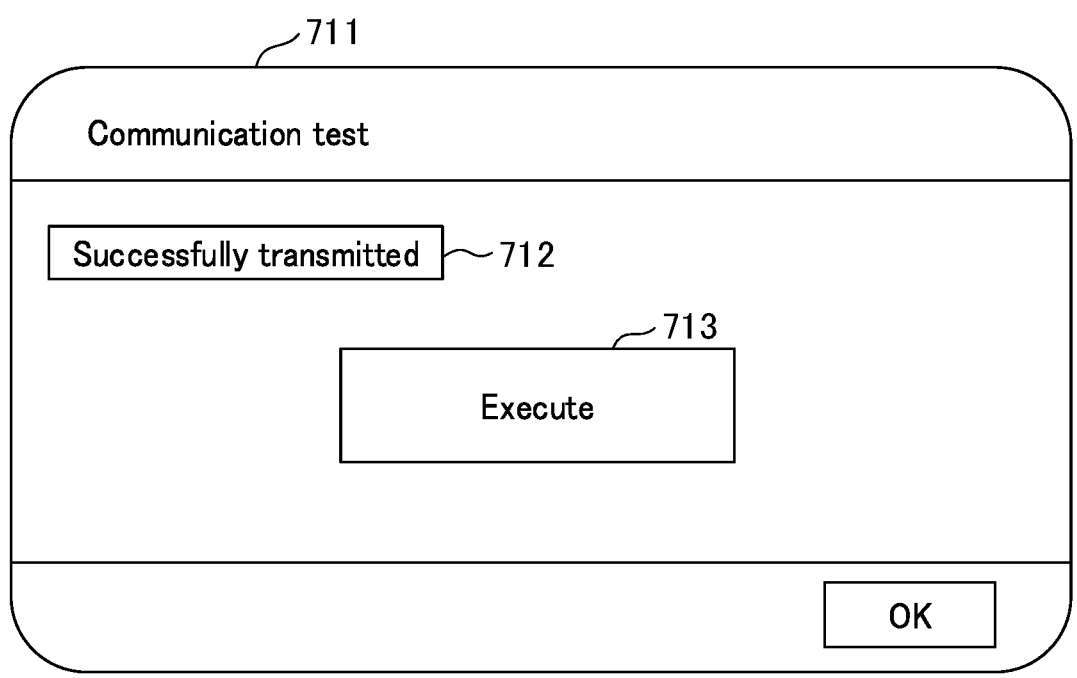

FIG. 11B is an example of the LUI screen that displays the fact that the communication test has succeeded. On the LUI screen 711, for example, a wording 712 such as "successfully transmitted" is displayed. Additionally, the LUI screen 711 may have an "execute" button 713 for executing the communication test again. Upon the pressing of the "execute" button 713 of the communication test, the communication test is executed again.

If the communication test has succeeded, the image processing apparatus 102 starts periodical e-mail transmissions in accordance with the transmission time 625 and the transmission interval 626 set on the LUI screen 621 that displays the transmission destination setting (FIG. 7A). If the communication test has succeeded and an error occurs in the image processing apparatus 102, the image processing apparatus 102 transmits an e-mail that provides a notification about the error information. Specifically, the communication test is a test for confirming whether or not communication with the mail server 105 is possible, which means of the starting of a transmission operation of the device information by e-mail.

Figure 12:
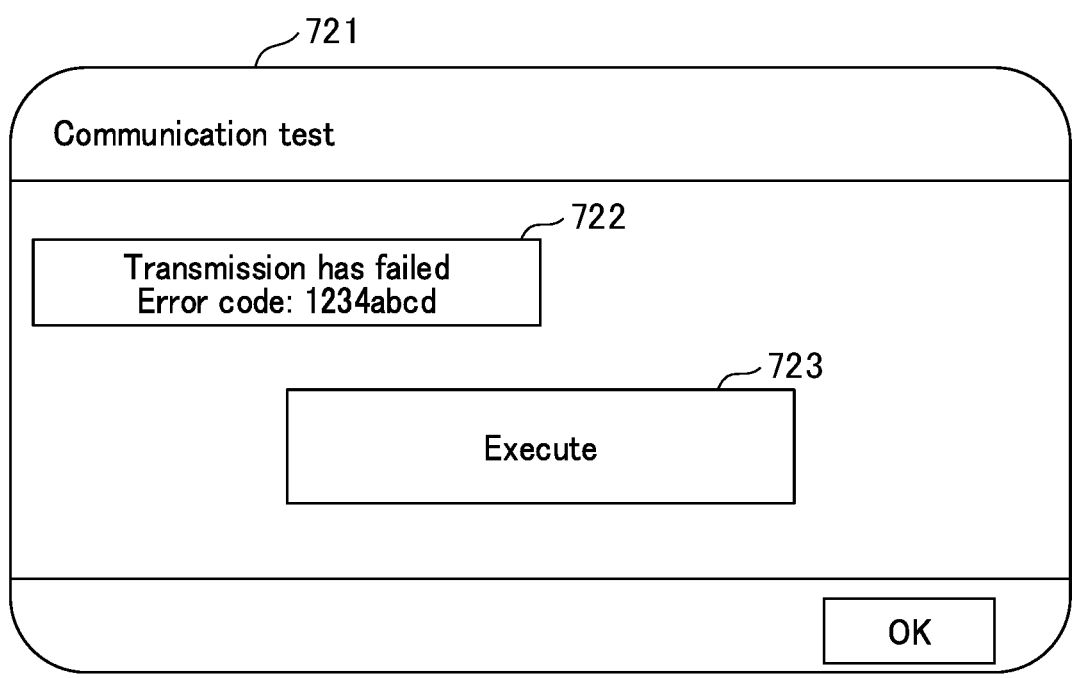
FIG. 12 illustrates an example of the LUI screen related to the communication test of the image processing apparatus.

FIG. 12 is an example of the LUI screen that displays that the communication test has failed. On the LUI screen 721, for example, wording such as "transmission has failed" and an error code 722 are displayed. The error code 722 indicates the error content when a transmission has failed, such as a connection timeout or a mail server response error. Additionally, LUI screen 721 may have an "execute" button 723 to execute the communication test again. Upon the pressing of the "execute" button 723 of the communication test, the communication test is executed again.

FIG. 13A is an example of the LUI screen that displays the transmission history. By the pressing of the transmission history 616 on the LUI screen (FIG. 6B), the screen transitions to the LUI screen 801 that displays the transmission history. On the LUI screen 801 that displays the transmission history, the e-mail transmission history, and the e-mail transmission result are displayed. The content displayed on the LUI screen 801 is, for example, a date 802, a type 803, a transmission destination 804, and a result 805.

On the LUI screen 801, upon selection of one history and the pressing of a "detailed information" button 806, the screen transitions to an LUI screen 811 (FIG. 13B) that displays the detailed information of the transmission history. Note that, on the LUI screen 801 that displays the transmission history, only a history having results when the transmission result has succeeded may be displayed, or a history may be displayed irrespective of whether the transmission has succeeded or failed.

Figure 13B:
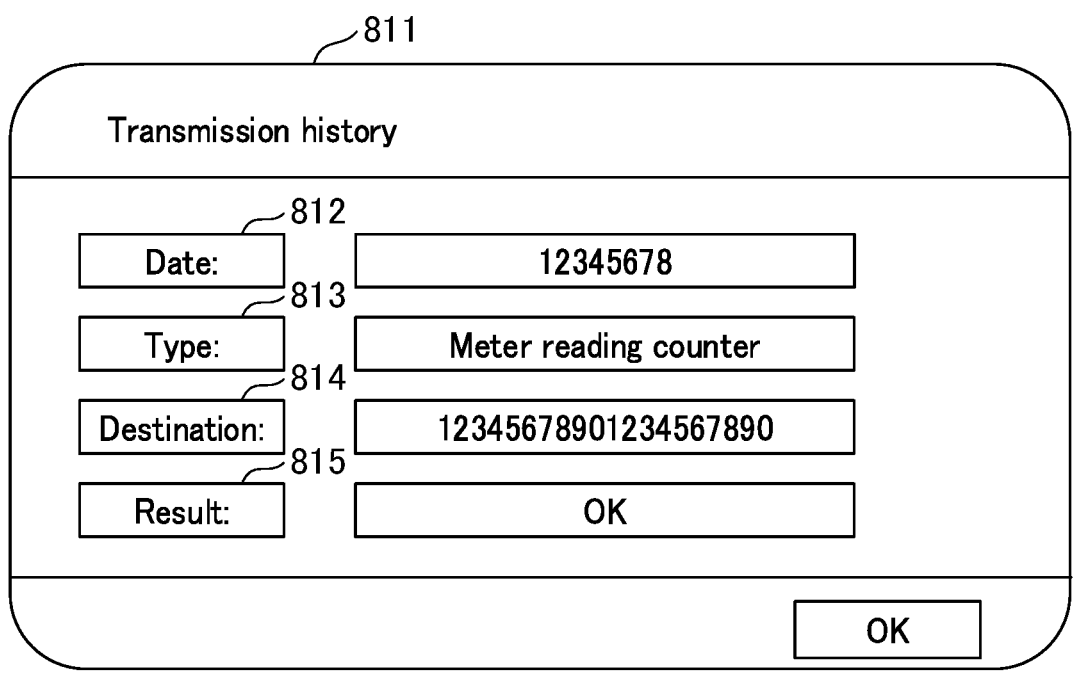

FIG. 13B is an example of the LUI screen that displays the detailed information of the transmission history. The LUI screen 811 that displays the detailed information of the transmission history displays the detailed information of the history selected on the LUI screen 801 that displays the transmission history. The content displayed on the LUI screen 811 is, for example, a date and time 812, a type 813, a transmission destination 814, and a result 815.

On the LUI screen 811, in addition to the information in FIG. 13A, more detailed information about not only a date of the transmission history but also a time and the like is displayed. Additionally, information other than the content described above may be included. For example, the e-mail content actually transmitted may be displayed.

Figure 14A:
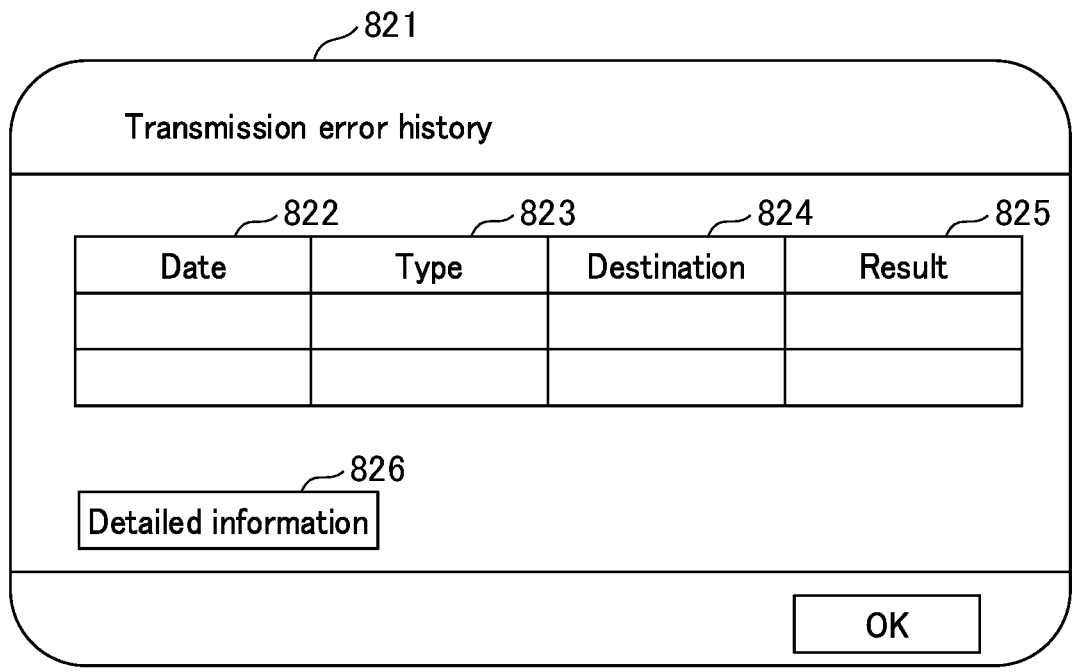
FIG. 14A and FIG. 14B illustrate an example of the LUI screen related to the transmission history of the image processing apparatus.

FIG. 14A is an example of the LUI screen that displays the transmission error history. By the pressing of the transmission error history 617 on the LUI screen (FIG. 6B), the screen transitions to the LUI screen 821 that displays a transmission error history. On the LUI screen 821 that displays the transmission error history, a history in which the transmission result becomes an error is displayed.

The content displayed on the LUI screen 821 is, for example, a date 822, a type 823, a transmission destination 824, and a result 825. Additionally, for example, an error code indicating the error content when a transmission has failed may be displayed. On the LUI screen 821, upon selection of one history and the pressing of a "detailed information" button 826, the screen transitions to the LUI screen 831 that displays the detailed information of the transmission error history.

Figure 14B:
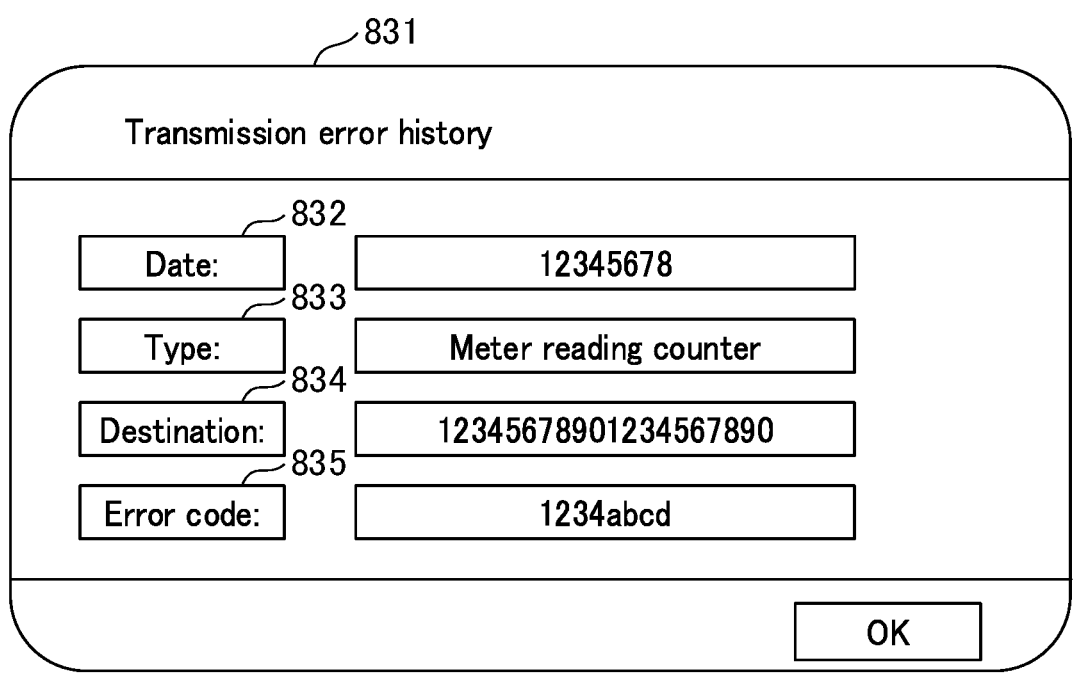

FIG. 14B is an example of the LUI screen that displays the detailed information of the transmission error history. An LUI screen 831 that displays the detailed information of the transmission error history displays the detailed information of the history selected on the LUI screen 821 that displays the transmission error history. The content displayed on the LUI screen 831 is, for example, a date and time 832, a type 833, a transmission destination 834, and a result 835.

On the LUI screen 831, in addition to the information in FIG. 14A, more detailed information about, for example, not only a date of the transmission history but also a time thereof is displayed. Additionally, information other than the content described above may be included. For example, the e-mail content actually transmitted may be displayed. Additionally, for example, an error code indicating error content when transmission has failed may be displayed.

Figure 15A:
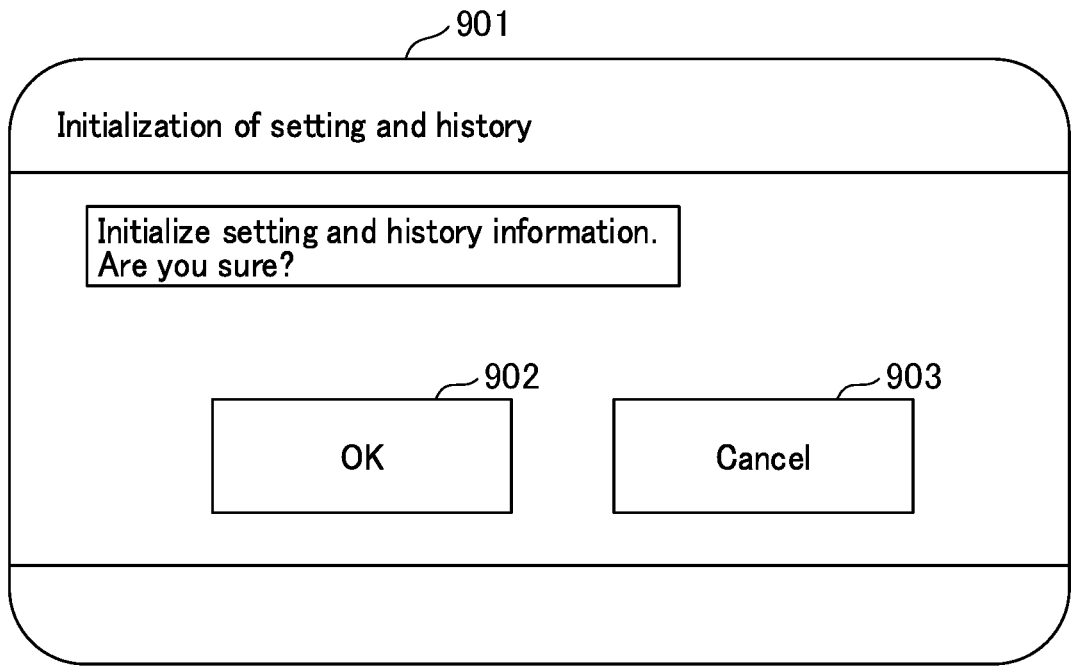
FIG. 15A and FIG. 15B illustrate an example of the LUI screen related to the initialization of settings of the image processing apparatus.

FIG. 15A is an example of the LUI screen that displays the initialization of setting and history. By the pressing of the "setting and history initialization" 618 button on the LUI screen (FIG. 6B), the screen transitions to the LUI screen 901 that displays the initialization of setting and history. The LUI screen 901 that displays the initialization of setting and history has an "OK" button 902 and a "Cancel" button 903.

Upon the pressing of the "OK" 902 button, the initialization of all settings and all histories related to the e-mail transmission from the image processing apparatus 102 described above is executed, and the screen transitions to an LUI screen 911 (FIG. 15B) that displays the execution results for the initialization of setting and history. By executing initialization, periodic transmissions of the device information from the image processing apparatus 102 and the transmission of error information upon the occurrence of error by e-mail stops.

Figure 15B:
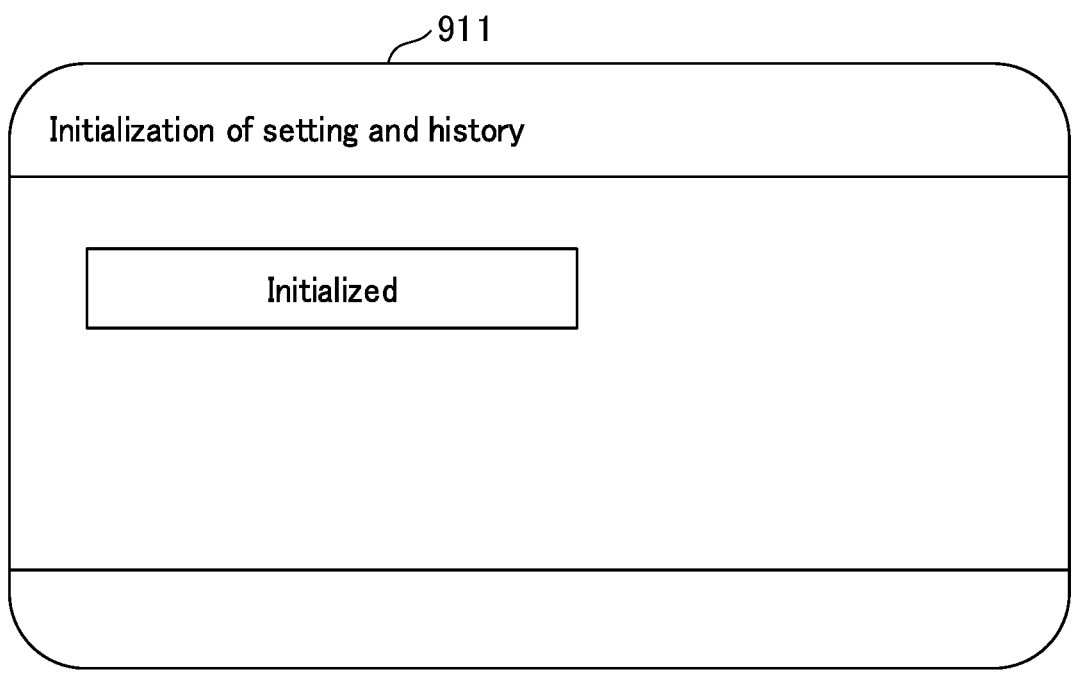

FIG. 15B is an example of the LUI screen that displays the execution result for the initialization of settings and history. The LUI screen 911 that displays the execution result of the initialization of settings and history is a screen after the initialization of setting and history has been executed, and a wording such as "initialized" is displayed.

Figure 16:
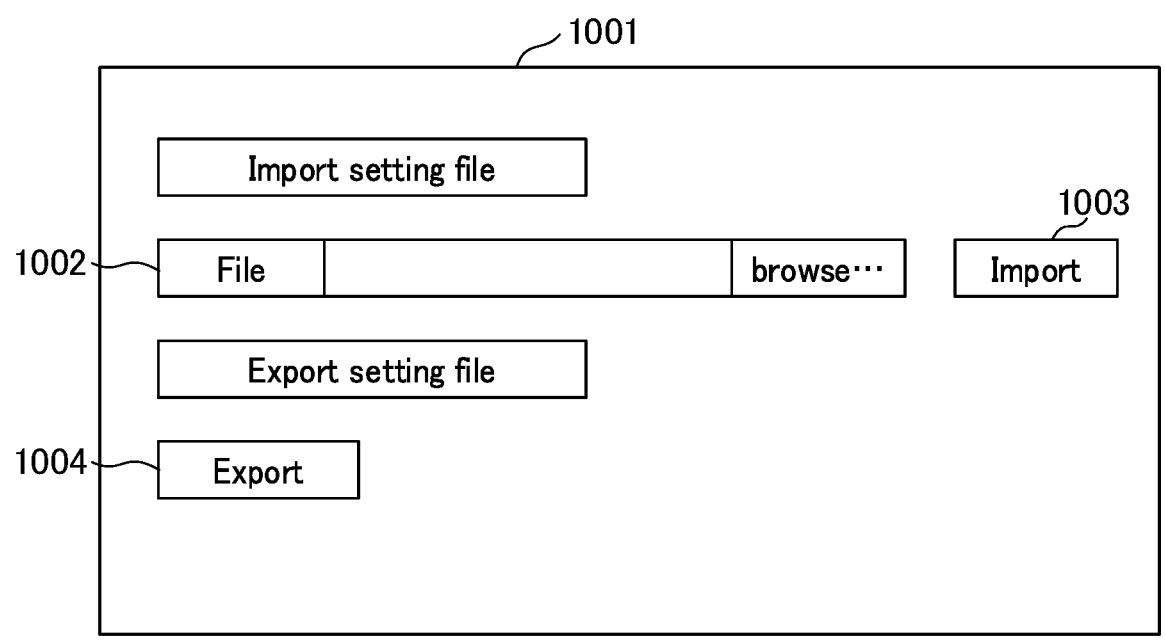
FIG. 16 illustrates an example of an RUI screen of the image processing apparatus.

FIG. 16 is an example of the RUI screen provided by the RUI control unit 308 of the image processing apparatus 102. In an RUI screen 1001, import and export of setting files can be executed. The import of settings is executed by specifying a location where the setting file to be imported into a file 1002 is stored by a path, and pressing an "import" button 1003.

Note that the setting file to be imported can be directly specified by pressing the "Browse . . . " button of the file 1002. Additionally, upon the pressing of an "export" button 1004, export of the setting file is executed, and a setting file indicating the current setting of the image processing apparatus 102 can be output to an information processing apparatus by which an RUI screen is browsed or to a predetermined location, or to a specified location.

Figure 17A:
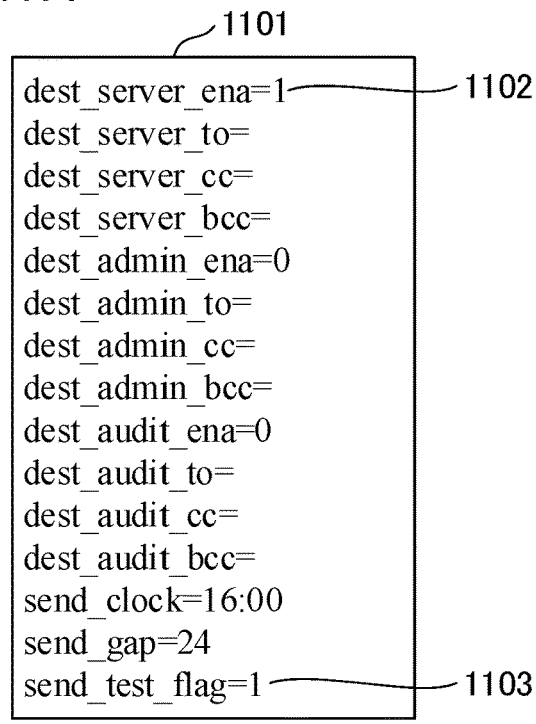
FIG. 17A and FIG. 17B illustrate an example of a setting file.

FIG. 17A is an example of the setting file to be imported. In a setting file 1101, a dest_server_ena 1102 corresponds to the setting of the presence or absence (ON/OFF) 622 of the e-mail transmission to the management server of the LUI screen 621 (FIG. 7A) that displays the transmission destination setting. Although not all setting items are shown in FIG. 17A, all items that can be set on the LUI screen can be set in an import file specified on the RUI screen.

A send_test_flag 1103 is a flag indicating whether or not the communication test is to be performed, and if the value is 1, the communication test is executed after the setting file is imported. If the setting and communication test are executed on the LUI screen, the communication test is executed after various settings are performed as described above. Specifically, two-step operations, which are various settings and an instruction to execute the communication test, are performed.

In contrast, if various settings are performed by importing the setting file on the RUI screen, an item (send_test_flag 1103) indicating the setting as to whether or not the communication test is to be performed is included in the setting file 1101. Accordingly, it is possible to execute various settings and an instruction to execute a communication test in one step.

If the value of send_test_flag is 0, the communication test is not executed after the setting file is imported. For example, this is conceivable that, the communication test is not executed by setting the value of the send_test_flag to 0 if it is desired to perform setting in advance in a factory or the like before the image processing apparatus 102 is used in a user environment. In contrast, if the operation of the image processing apparatus 102 starts in the user environment, it is conceivable that the value of send_test_flag is set to 1.

Figure 17B:
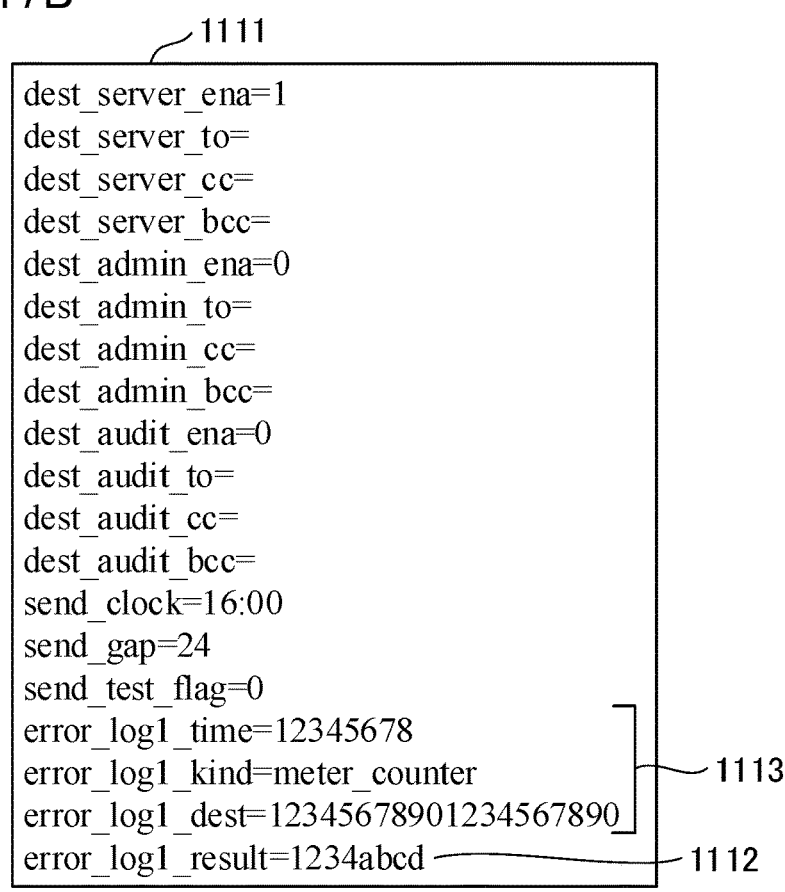

FIG. 17B illustrates an example of the setting file to be exported. In a setting file 1111, an error_log1_result 1112 corresponds to the result 835 on the LUI screen 831 (FIG. 14B) indicating the detailed information of the transmission error history. Additionally, the setting file 1111 to be exported includes information such as transmission history (not illustrated) and a transmission error history 1113.

This is because it is not possible to refer to the result of the communication test on the RUI screen in a case where the communication test is executed by the RUI. Thus, by including the information about the transmission history and the transmission error history in the file to be exported, it is possible to investigate the cause of an error if a transmission has failed.

Figure 18:
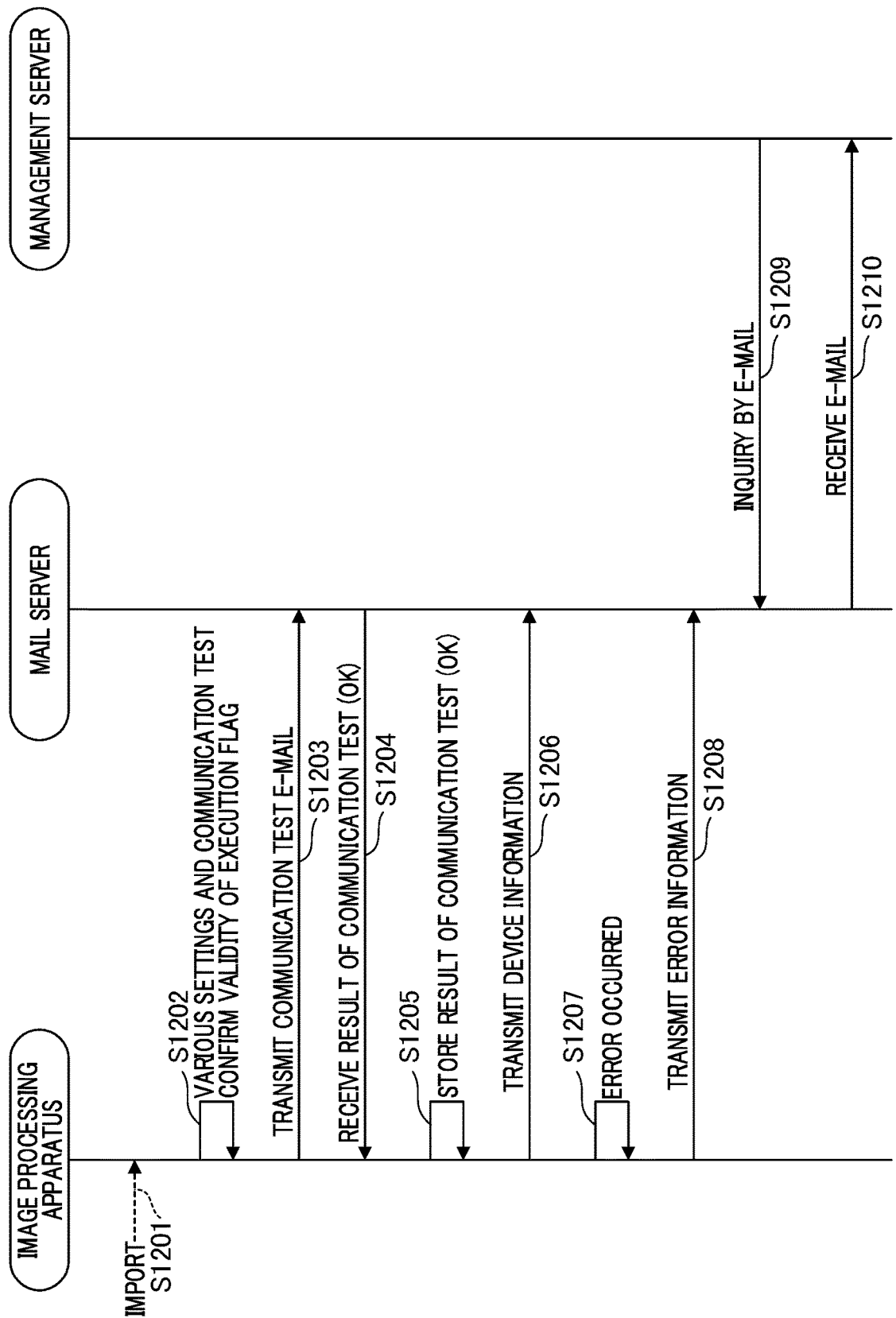
FIG. 18 illustrates a sequence diagram of a process in executing a communication test in the image processing apparatus.

FIG. 18 is a sequence diagram of processing in executing the communication test in the image processing apparatus 102. In FIG. 18, the process of the image processing apparatus 102 is realized by reading out and executing a program stored in the ROM 203 or the storage device 204 and the like by the CPU 201 of the image processing apparatus 102. Additionally, the process of the management server 106 is realized by reading out and executing a program stored, for example, in the storage device 254, by the CPU 251 of the management server 106.

In step S1201, the image processing apparatus 102 receives an import of the setting file on the RUI screen (FIG. 16). In step S1202, the image processing apparatus 102 performs import processing of various settings and confirms whether or not a flag indicating whether or not the communication test is to be performed is valid. In this context, a case in which performing communication test is set in the setting file will be described. In step S1203, the image processing apparatus 102 transmits an e-mail about the communication test to the mail server 105.

In step S1204, the image processing apparatus 102 receives a result indicating that the e-mail about the communication test has been successfully transmitted. In step S1205, the image processing apparatus 102 stores the information (for example, transmission history) that the communication test has succeeded. Subsequently, when a time passes and reaches the time for periodic transmissions that have been set, the image processing apparatus 102 performs transmission of the predetermined device information by e-mail in step S1206. Additionally, if an error occurs in the image processing apparatus 102, the image processing apparatus 102 detects the occurrence of the error in step S1207.

In step S1208, the image processing apparatus 102 transmits the error information by e-mail. In step S1209, the management server 106 inquires the mail server 105 about the e-mail. In step S1210, the management server 106 receives the e-mail transmitted by the image processing apparatus 102. Note that although only one mail server 105 is illustrated in FIG. 18, an e-mail transmitted by the image processing apparatus 102 may be received by the management server 106 via a plurality of mail servers.

Figure 19:
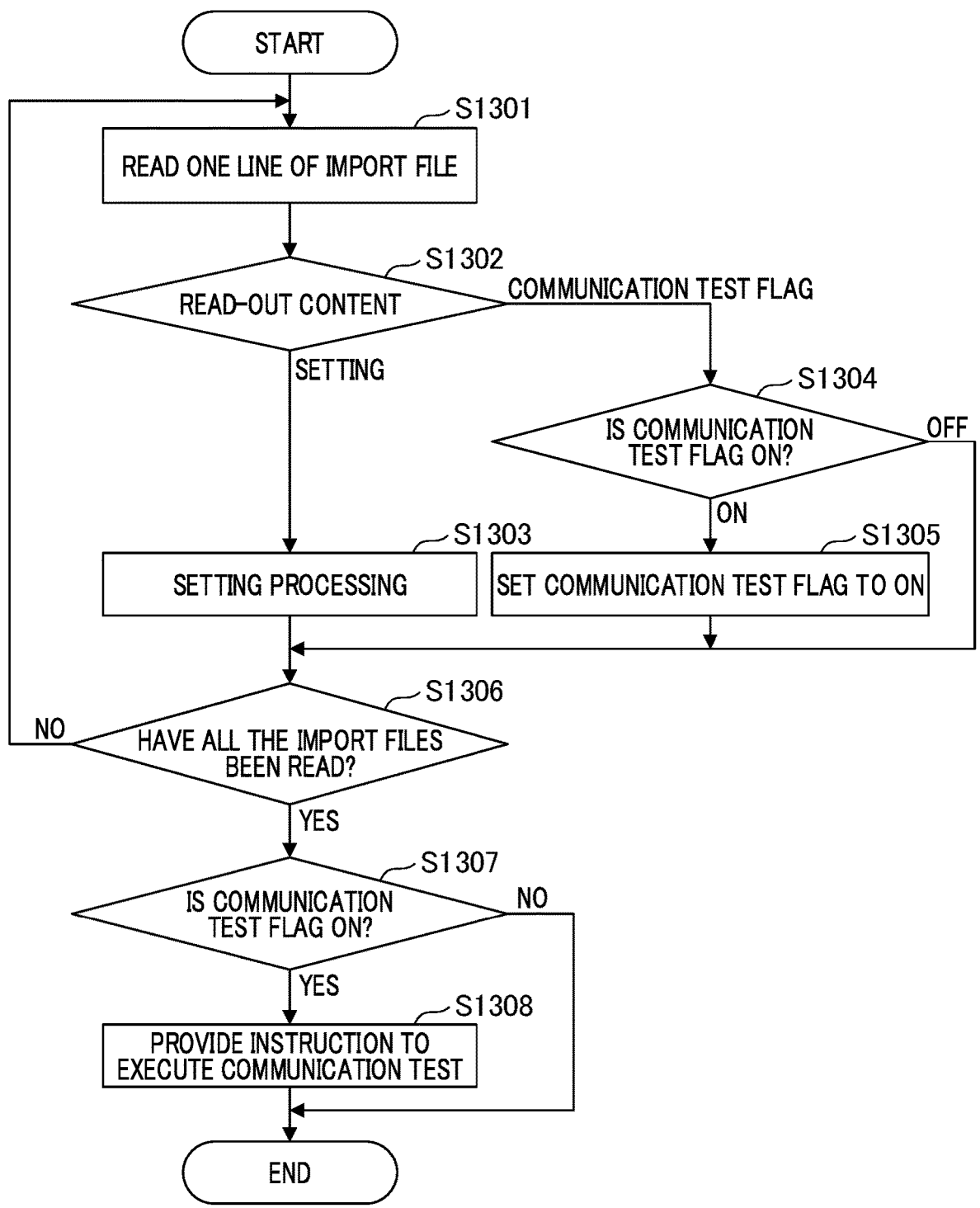
FIG. 19 illustrates an import processing of a setting file pertaining to the image processing apparatus.

FIG. 19 is a flowchart that illustrates an import processing of the setting file in the image processing apparatus 102. The processing of the RUI control unit 308 in this flowchart is realized by reading out and executing a program stored, for example, in the ROM 203 or the storage device 204 by the CPU 201 of the image processing apparatus 102.

Upon receipt of the import of the setting file on the RUI screen (FIG. 16), in step S1301, the RUI control unit 308 reads out (acquires) the setting file to be imported from the beginning for each one line. The RUI control unit 308 determines whether the content that has been read out in step S1302 is a flag indicating whether or not a communication test is to be performed, or content related to other various settings. If the content that has been read relates to other various settings, the process proceeds to step S1303, and if the content is a flag indicating whether or not the communication test is to be performed, the process proceeds to step S1304.

The send_test_flag 1103 shown in FIG. 17A is an example of a flag indicating whether or not the communication test is to be performed. Specifically, if the content that has been read in step S1301 is send_test_flag 1103, the process proceeds to step S1304. The RUI control unit 308 executes setting processing regarding the setting that has been read out in step S1303. That is, in accordance with the setting that has been read out from the setting file to be imported, the setting is reflected to the current setting.

In step S1304, the RUI control unit 308 analyzes the content of the flag indicating whether or not the communication test is to be performed, and determines whether or not the communication test is to be performed. If it is determined that the communication test is to be performed, the process proceeds to step S1305. If it is determined that the communication test is not to be performed, the process proceeds to step S1306. In step S1305, the RUI control unit 308 sets an execution flag to ON, which indicates that the communication test is to be executed after the setting file is imported.

In step S1306, the RUI control unit 308 determines whether or not all the setting files to be imported have been read. If all the setting files have been read, the process proceeds to step S1307. If some unread lines remain, the process returns to step S1301. In step S1307, the RUI control unit 308 determines whether or not the execution flag indicating execution of the communication test is ON. If the execution flag is ON, the process proceeds to step S1308. If the execution flag is OFF, the process of the flowchart shown in FIG. 19 ends. In step S1308, the RUI control unit 308 provides an instruction to execute the communication test to the communication test control unit 310.

Figure 20:
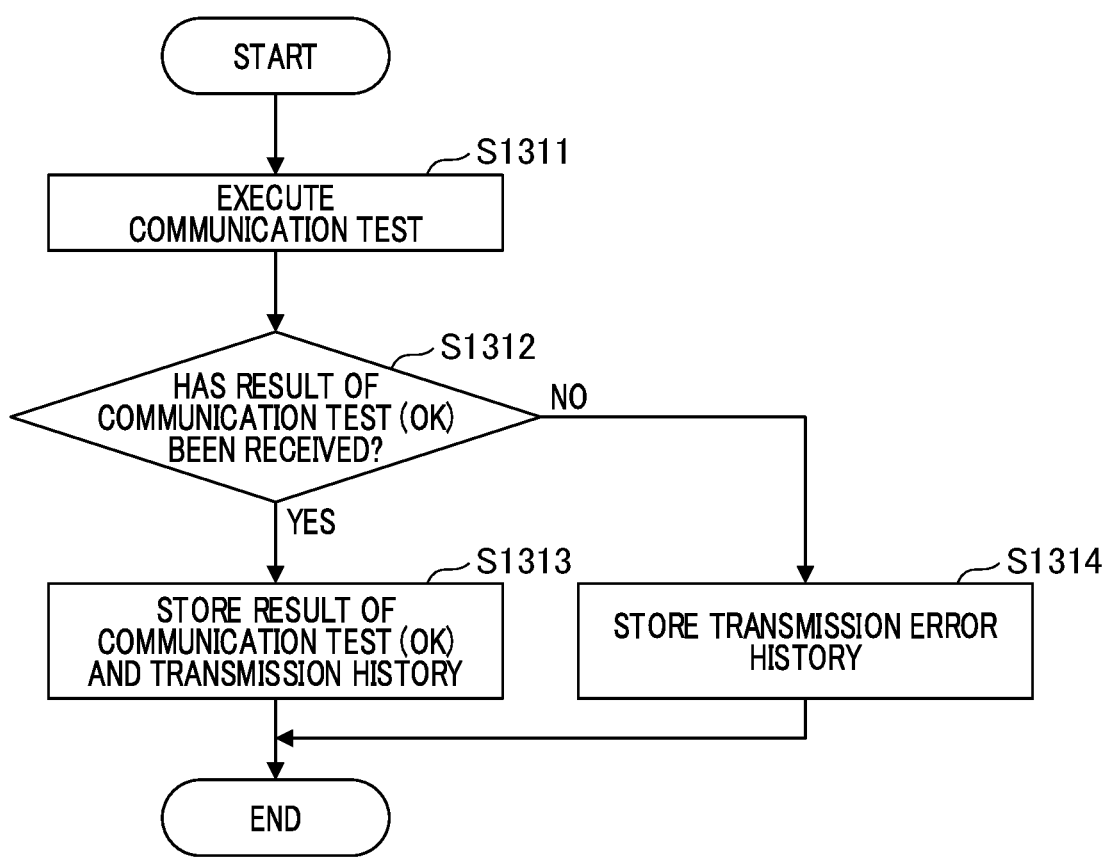
FIG. 20 illustrates execution processing of the communication test pertaining to the image processing apparatus.

FIG. 20 is a flowchart that illustrates execution processing of the communication test in the image processing apparatus 102. The processing of the communication test control unit 310 in this flowchart is realized by the CPU 201 of the image processing apparatus 102 by reading out and executing a program stored in, for example, the ROM 203 or the storage device 204.

In step S1311, the communication test control unit 310 transmits an e-mail about the communication test to the mail server 105. In step S1312, the communication test control unit 310 determines whether or not the communication test has been successfully transmitted. If the communication test has been successfully transmitted, the process proceeds to step S1313. If the transmission has failed, the process proceeds to step S1314.

In step S1313, the communication test control unit 310 stores the information indicating that the communication test has succeeded and the transmission history, and ends the process of the flowchart shown in FIG. 20. In contrast, in step S1314, the communication test control unit 310 stores the information indicating that the communication test has failed and the transmission history as a transmission error history, and ends the process of the flowchart shown in FIG. 20.

Note that according to the present embodiment, if there is a plurality of image processing apparatuses 102, it is possible to instruct the plurality of image processing apparatuses 102 to perform the setting and execute the communication test collectively, thereby enhancing the convenience. Hereinafter, the setting and execution of the communication test when there is a plurality of image processing apparatuses 102 will be described.

FIG. 21 illustrates an HTTP packet when importing a setting file. An HTTP packet 1401 indicates an HTTP packet generated upon providing an instruction to import the setting file 1101 by an external information processing apparatus by using the RUI. For example, the HTTP packet 1401 is transmitted to the image processing apparatus 102 by pressing the "import" button 1003 by using the RUI screen 1001 (FIG. 16) provided by the image processing apparatus 102.

The Host header of the HTTP packet 1401 is a destination indicating the image processing apparatus 102. Here, while changing the IP address of the Host header to a destination indicating another image processing apparatus that is different from the image processing apparatus 102, scripts that transmit an HTTP packet are continuously generated. Accordingly, it is possible to provide an instruction to perform settings and execute a communication test to the image processing apparatuses collectively. As described above, since the image processing apparatus 102 can provide an instruction to perform settings and execute a communication test in one step, a process to the image processing apparatuses can be performed collectively.

Second Embodiment

Before the image processing apparatus 102 directly transmits data to the management server 106, the content of the transmission data is confirmed by an auditor in some cases. At that time, the image processing apparatus 102 transmits the transmission data to the address of the auditor by e-mail, whereby the confirmation operation can be performed by the auditor PC 104. Subsequently, the auditor can transmit only the information approved by the auditor from the auditor PC 104 to the management server 106, for example, by e-mail.

In the present embodiment, improvement of the process for causing the management server 106 to manage only such information approved by the auditor will be described. In particular, a process that enables reception of information approved by the management server 106 via the mail server 105 by transmitting only the information approved by the auditor from the image processing apparatus 102 to the mail server 105 as an e-mail will be described.

FIG. 22 is a sequence diagram of a process upon execution of the approval by the image processing apparatus 102. Note that, in FIG. 22, the processing of the image processing apparatus 102 is realized by the CPU 201 of the image processing apparatus 102 by reading and executing a program stored in, for example, the ROM 203 or the storage device 204. Additionally, the processing of the management server 106 is realized by the CPU 251 of the management server 106 by reading out and executing a program stored in, for example, the storage device 254.

Since the sequence in which the image processing apparatus 102 executes the communication test has already been described with reference to FIG. 18, the description in the present embodiment will be omitted. In step S2201, the image processing apparatus 102 stores predetermined device information. In the present embodiment, although only one latest device information is stored and old information is deleted, any number of pieces of the predetermined device information may be stored. In step S2202, the image processing apparatus 102 transmits the URL link of the RUI to the auditor PC 104 by e-mail. At this time, the image processing apparatus 102 may transmit the predetermined device information together with the URL link of the RUI. In step S2203, upon receipt of an RUI connection from the auditor PC 104, the image processing apparatus 102 displays the RUI screen as shown in FIG. 23. In step S2204, the image processing apparatus 102 receives the approval of the predetermined device information from the auditor PC 104, and, in step S2205, the image processing apparatus 102 transmits the predetermined device information to the mail server 105 by e-mail.

Additionally, if an error occurs in the image processing apparatus 102, in step S2206, the image processing apparatus 102 detects the occurrence of the error. In step S2207, the image processing apparatus 102 stores the error information. In the present embodiment, although only three latest pieces of the error information are stored and old information is deleted, any number of pieces of the error information may be stored.

In step S2208, the image processing apparatus 102 transmits the URL link of the RUI to the auditor PC 104 by e-mail. At this time, the image processing apparatus 102 may transmit the error information together with the URL link of the RUI. Additionally, different URL links of the RUI may be used for the device information and the error information. In step S2209, upon receipt of the RUI connection from the auditor PC 104, the image processing apparatus 102 displays an RUI screen as shown in FIG. 23. In step S2210, the image processing apparatus 102 receives the approval of the error information from the auditor PC 104, and in step S2211, the image processing apparatus 102 transmits the error information to the mail server 105 by e-mail.

In step S2212, the management server 106 inquires the mail server 105 about e-mail. In step S2213, the management server 106 receives the e-mail transmitted by the image processing apparatus 102. Note that although only one mail server 105 is illustrated in FIG. 22, the e-mail transmitted by the image processing apparatus 102 may be received by the management server 106 via a plurality of mail servers.

FIG. 23 illustrates an example of the RUI screen related to the approval of the image processing apparatus 102. An RUI screen 2301 shown in FIG. 23 is provided by the RUI control unit 308 of the image processing apparatus 102.

On the RUI screen 2301, the image processing apparatus 102 displays a list of information stored in step S2201 and step S2207 in FIG. 22, where the information can be individually selected to execute approval. The content displayed on the RUI screen 2301 is, for example, a check box 2302, an information type 2303, an identifier 2304, an approved mark 2305, and an "approval" button 2306. On the RUI screen 2301 according to the present embodiment, although only the latest one piece of the information of the meter reading counter (counter used for the purpose of grasping an operation amount, charging, and the like) and only the latest three pieces of the error information are displayed, old information is not displayed. However, the number of pieces of the information displayed on the RUI screen 2301 can be appropriately changed without being limited to the above example. Additionally, the check box 2302 is used to indicate the selected information from among the information to be approved.

The information type 2303 indicates the information type such as a meter reading counter or an error. The display portion of the information type 2303 is configured such that the information to be transmitted as an e-mail can be referred to as the detailed information by pressing it. The detailed information of the information type 2303 may be a HEX display or may be an ASCII display such that the auditor can understand the content. Additionally, both HEX and ASCII may be displayed as the detailed information.

The error information displayed on the RUI screen 2301 may be divided into an alarm and a jam. Additionally, on the list of the RUI screen 2301, only one piece of error information may be displayed, and three pieces of information may be displayed upon display of the detailed information. In that case, there is only one check box 2302 corresponding to the error information on the RUI screen 2301. If the check box 2302 corresponding to this error information is selected, three pieces of the error information are collectively transmitted.

The identifier 2304 is a uniquely determined value for identifying the information. The identifier 2304 may be the time when the image processing apparatus 102 has stored the information or the time when it has transmitted the URL link of the RUI.

The approved mark 2305 is used for indicating the information that has already been approved and transmitted successfully. On the RUI screen 2301, the information type 2303 of the information having the approved mark 2305 performs display processing such as grayout, and disables the operation on the RUI screen 2301. In the present embodiment, although the information remains on the RUI screen 2301 if the transmission has succeeded, the information may be deleted from the RUI screen 2301 if the transmission has succeeded.

Upon detection of an operation such as pressing the "approval" button 2306, the image processing apparatus 102 transmits the information selected by checking the check box 2302 to the mail server 105 as an e-mail. Note that in the present embodiment, although an example in which the device information and the error information are displayed on the same RUI screen 2301 has been described, the device information and the error information may be displayed on individual RUI screens.

Additionally, upon transmission of an e-mail, the e-mail that has already been transmitted is displayed on the transmission history screen in FIG. 13A. At this time, for the e-mail that has been transmitted after the approval, a mark indicating the approval may be displayed on the transmission history screen. As described above, only the information approved by the auditor PC 104 can be transmitted from the image processing apparatus 102 to the mail server 105 as an e-mail.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-133140, filed Jul. 13 2018 and Japanese Patent Application No. 2018-222596, filed Nov. 28 2018, which is hereby incorporated by reference wherein in its entirety.

What is claimed is:

1. An image processing apparatus including a web server, comprising:
a memory storing instructions; and
a processor executing the instructions causing the image processing apparatus to:
provide a screen that imports a setting file of an application operating on the image processing apparatus via the web server;
perform reflecting a setting value included in the imported setting file;
perform, according to another setting value included in the setting file, setting so as to control execution of a communication test for confirming whether or not communication with an external device used by the application is possible; and
execute the communication test in accordance with the setting,
wherein, in a case where the another setting value is not included in the setting file, the communication test is not executed.

2. The image processing apparatus according to claim 1, wherein, in the execution, an electronic mail is transmitted to a mail server as the communication test, and
wherein the instructions further cause the image processing apparatus to store a transmission history of the electronic mail and the result of the communication test.

3. The image processing apparatus according to claim 2, wherein the instructions further cause the image processing apparatus to provide a screen that exports the setting file via the web server, and
wherein, the exported setting file includes the transmission history of the communication test and the result of the communication test.

4. The image processing apparatus according to claim 1, wherein the instructions further cause the image processing apparatus to display, as the application, a screen for receiving an instruction to execute the communication test.

5. The image processing apparatus according to claim 1, wherein, in the setting file, at least a network setting for transmitting the electronic mail and a setting value indicating content of information to be transmitted by the electronic mail are included.

6. The image processing apparatus according to claim 1, wherein the instructions further cause the image processing apparatus to, if the result of the communication test is successful, start the transmission of device information of the image processing apparatus by the application at least one of a predetermined time and an interval starts, in accordance with the reflected setting value.

7. A method for controlling an image processing apparatus that includes a web server, the method comprising:
providing a screen that imports a setting file of an application operating on the image processing apparatus via the web server;
performing reflecting a setting value included in the imported setting file;
performing, according to another setting value included in the setting file, setting so as to control execution of a communication test for confirming whether or not communication with an external device used by the application is possible; and
executing the communication test in accordance with the setting,
wherein, in a case where the another setting value is not included in the setting file, the communication test is not executed.

8. A non-transitory storage medium on which is stored a computer program for making a computer execute:
providing a web server;
providing a screen that imports a setting file of an application operating on the image processing apparatus via the web server;
performing reflecting a setting value included in the imported setting file;
performing, according to another setting value included in the setting file, setting so as to control execution of a communication test for confirming whether or not communication with an external device used by the application is possible; and executing the communication test in accordance with the setting, wherein, in a case where the another setting value is not included in the setting file, the communication test is not executed.

* * * * *